United States Patent
Forti

(10) Patent No.: US 7,076,386 B2
(45) Date of Patent: Jul. 11, 2006

(54) COMPUTER CARD FOR ELECTRO-PNEUMATIC CALIBRATORS WITH SYSTEM MANAGEMENT

(75) Inventor: Jose Edmans Forti, Sao Paulo (BR)

(73) Assignee: Importadora Edmansport Comericio E Industria LTDA., Sao Paulo (BR)

( * ) Notice: Subject to any disclaimer, the term of this patent is extended or adjusted under 35 U.S.C. 154(b) by 0 days.

(21) Appl. No.: 10/020,097

(22) Filed: Dec. 18, 2001

(65) Prior Publication Data

US 2003/0040843 A1 Feb. 27, 2003

(30) Foreign Application Priority Data

Aug. 22, 2001 (BR) .................................... 0104852

(51) Int. Cl.
*G01L 27/00* (2006.01)
*G06F 19/00* (2006.01)

(52) U.S. Cl. ........................................................ 702/98

(58) Field of Classification Search .................. 702/98; 34/550, 505, 557, 506, 133; 73/146.3, 146.8
See application file for complete search history.

(56) References Cited

U.S. PATENT DOCUMENTS

| | | | | |
|---|---|---|---|---|
| 4,694,409 A * | 9/1987 | Lehman | ........................ | 700/282 |
| 5,103,391 A * | 4/1992 | Barrett | ........................ | 700/4 |
| 5,311,451 A * | 5/1994 | Barrett | ........................ | 700/278 |
| 5,707,674 A * | 1/1998 | Andrews | ........................ | 426/496 |
| 5,789,661 A * | 8/1998 | Fauque et al. | ........................ | 73/37.5 |
| 6,293,147 B1 * | 9/2001 | Parker et al. | ........................ | 73/462 |
| 6,758,088 B1 * | 7/2004 | Claussen et al. | ........................ | 73/146 |
| 6,779,392 B1 * | 8/2004 | Bell et al. | ........................ | 73/146.8 |

FOREIGN PATENT DOCUMENTS

BR  PI 9307921-4  9/1995

* cited by examiner

*Primary Examiner*—Michael Nghiem
*Assistant Examiner*—Aditya S. Bhat
(74) *Attorney, Agent, or Firm*—Stites & Harbison PLLC; Ross F. Hunt, Jr.

(57) ABSTRACT

The present computer card for electro-pneumatic calibrators with system management corresponds the an equipment for calibrating vehicle tires, automatically, made up by electronic, electric and mechanical components commanded by computer programs, of simple handling, fast and extremely safe, which can be remotely monitored and switched on by the insertion of coins.

46 Claims, 24 Drawing Sheets

| | |
|---|---|
| INDICATING TIME COUNTDOWN | FILLING – 2'15"<br>TIRE 20> 80 PSI |
| INDICATING TIME COUNTDOWN | FILLING – 1'30"<br>TIRE 20> 80 PSI |
| ONE MINUTE BEFORE THE END, A LOW BEEP SOUNDS | FILLING – 1'00"<br>TIRE 20> 80 PSI |
| TIRE IS READY, A BEEP SOUNDS | READY – 0'00"<br>TIRE 20> 80 PSI |
| TOTAL TIME AND PRESSURE PRIOR TO THE LAST FILLING | DURATION 2'15"<br>PREVIOUS 20> 80 PSI |
| WHEN PRESSING THE + OR – KEYS, THE DISPLAYS RETURNS TO: | DESIRED PRESSURE<br>> 81 PSI |

*FIG. 8*

WAITING FOR COIN
```
INSERT COIN
12/05  10:28  21°C
```

COIN INSERTED
```
INSERT COIN
0.25   0 MIN
```

COIN INSERTED
```
PRESS START KEY
0.50   3 MIN
```

START KEY
```
CHECK COMPRESSOR
```

*FIG. 9*

| INSERT WATER-0.25<br>AIR-0.50 VAC-0.75 | WAITING FOR COIN |
|---|---|
| INSERT COIN<br>0.25 | COIN INSERTED |
| CHOOSE SERVICE<br>0.50 | COIN INSERTED |
| CHOOSE SERVICE<br>0.75 | COIN INSERTED |
| CHECK VACUUM<br>0.75 | VACUUM CLEANER KEY |
| VACUUM ON<br>3 MIN | |
| VACUUM ON<br>2 MIN | |
| VACUUM ON<br>59 SEC | |

*FIG. 11*

140+52+230+2862=3284
3=C  2=B  8=H  4=D
CBHD

DATE: 06/28/00
BHJFJJ

PASSWORD: CBHDBHJFJJ

| 06/28/00 #BBHDBHJFJJ# |
|---|

| P=140  V=52 M=230  GT=2862 |
|---|

*FIG. 12*

GAUGING EXPIRATION NOTICE

| GAUGING EXPIRES WITHIN 15 DAYS |
|---|

CONTACT SERVICE

| CONTACT FACTORY PH: XXX-XXXX |
|---|

EQUIPMENT BLOCKED

| EXPIRED GAUGING SYSTEM BLOCKED |
|---|

RELEASED BY PASSWORD

| ENTER YOUR PASSWORD TO GAUGE THE SYSTEM |
|---|

*FIG. 13*

FIG. 14A  | PRESS RESET WELCOME | PRESS RESET MM/DD HH:MM T°C |

FIG. 14B  | DESIRED PRESSURE > 26 PSI |

FIG. 14C  | FILLING ..... TIRE=22 > 28 PSI | EMPTYING ..... TIRE=34 > 28 PSI |

FIG. 14D  | TIRE IS READY PREVIOUS=22 > 28 PSI |

FIG. 14E  | EMPTY TIRE ON TIRE=22 > 28 PSI |

FIG. 14F  | ERROR TIRE NOT DETECTED |

FIG. 14G  | DISCONNECTED TIRE=22 > 28 PSI |

FIG. 14H  | TIRES=158 PV=75 TOTAL=2590 | #AIR=230 #N2=498 T=1862 |

FIG. 14I — PRESS RESET / DISCONNECT TIRE

FIG. 14J — PRESS RESET / * EMERGENCY *

FIG. 14K — PRESS RESET / ER1 SEC. ON     PRESS RESET / ER2 S. PRESS. VAR.

FIG. 14L — EXPIRED. GAUGE / LAST – 03/25/96

FIG. 14M — SELECT AIR/N2 / 10/28  14:02  28°C

FIG. 14N — FRONT – 26 PSI / REAR – 28 PSI

FIG. 14O — PRESS RESET / MAX. PRESSURE – 60 PSI

FIG. 14P — PRESS RESET / AUTO ZERO ERROR

FIG. 14Q — PRESS RESET / ER3 COMPR. OIL

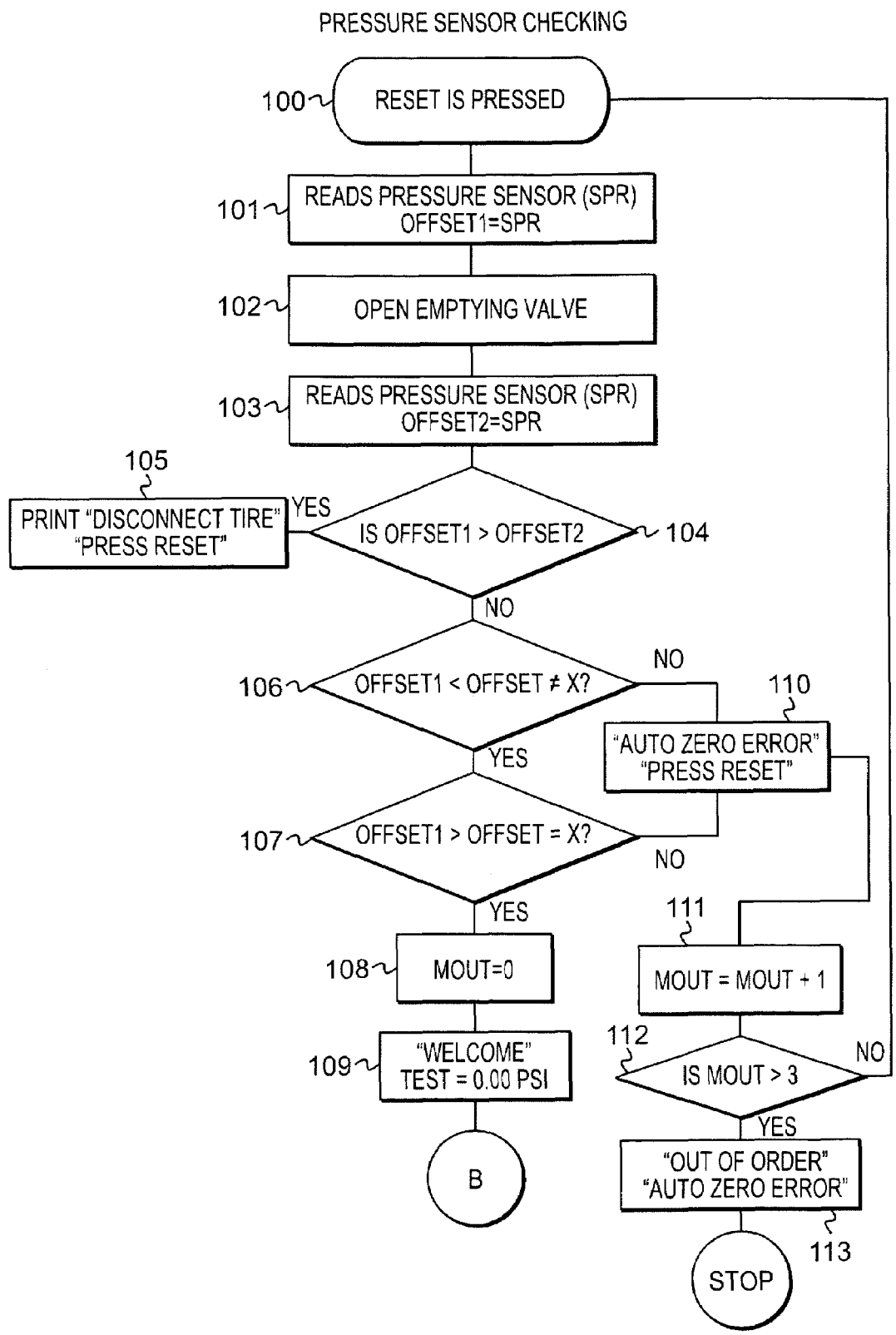
FIG. F2

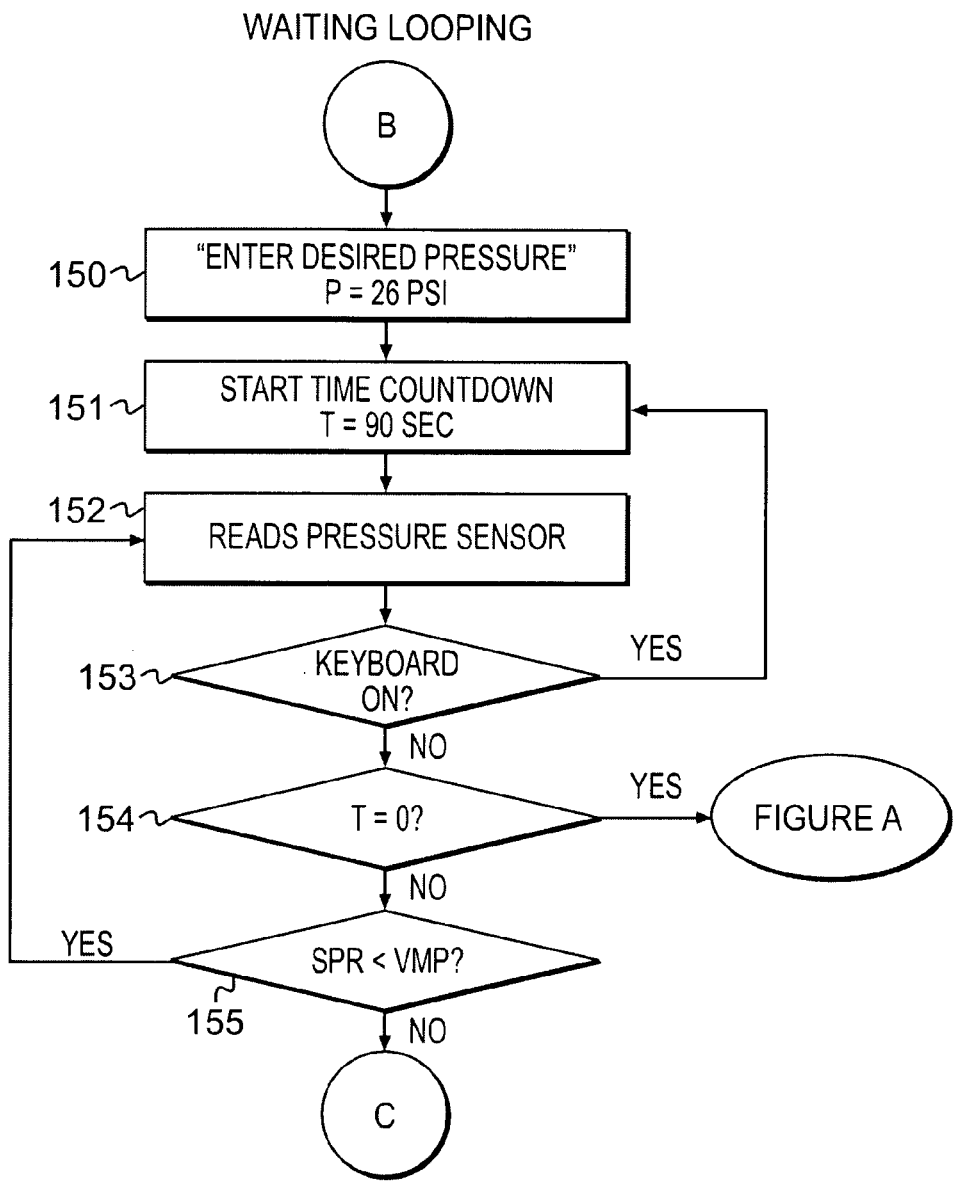
FIG. F3A

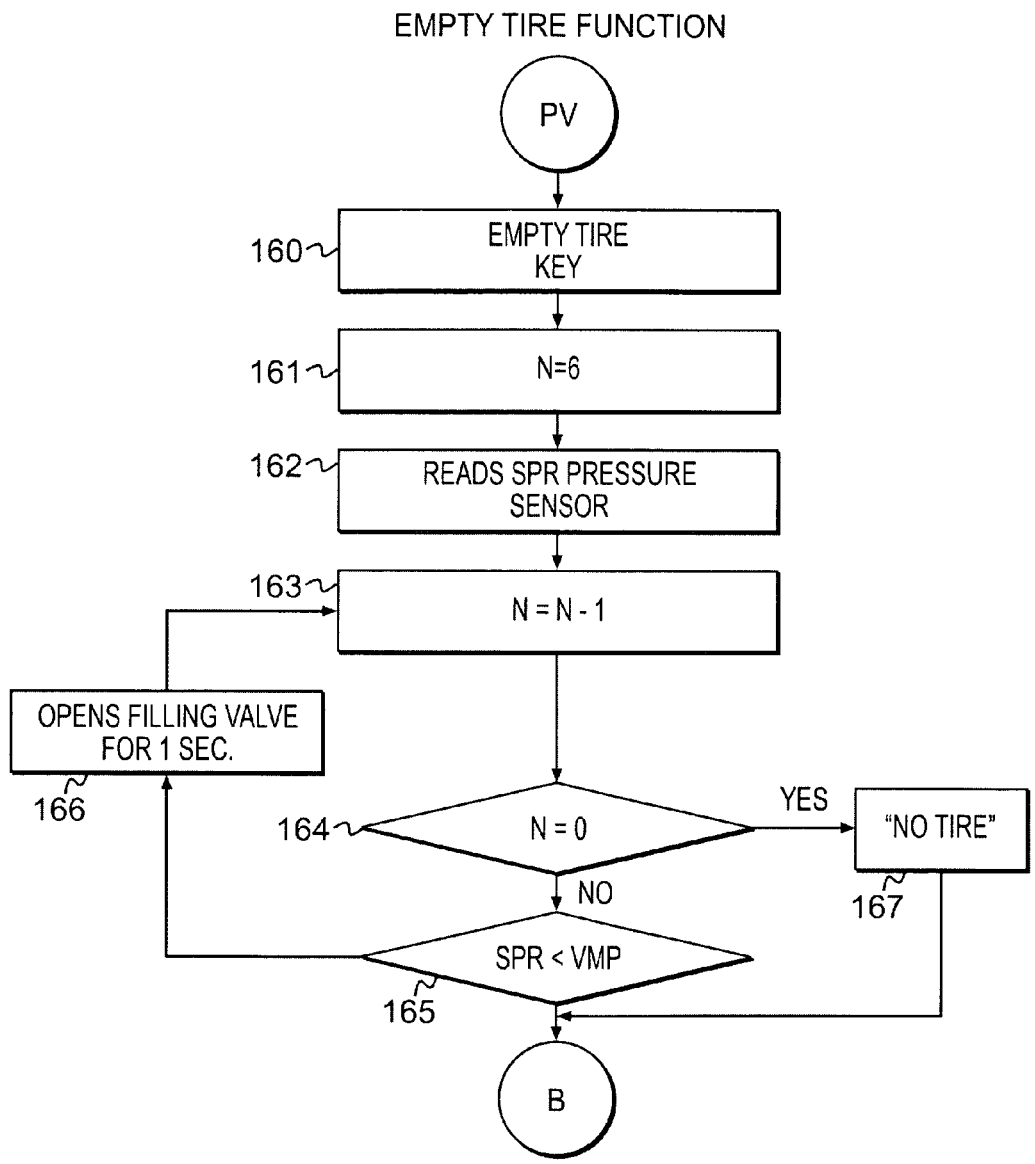
FIG. F3B

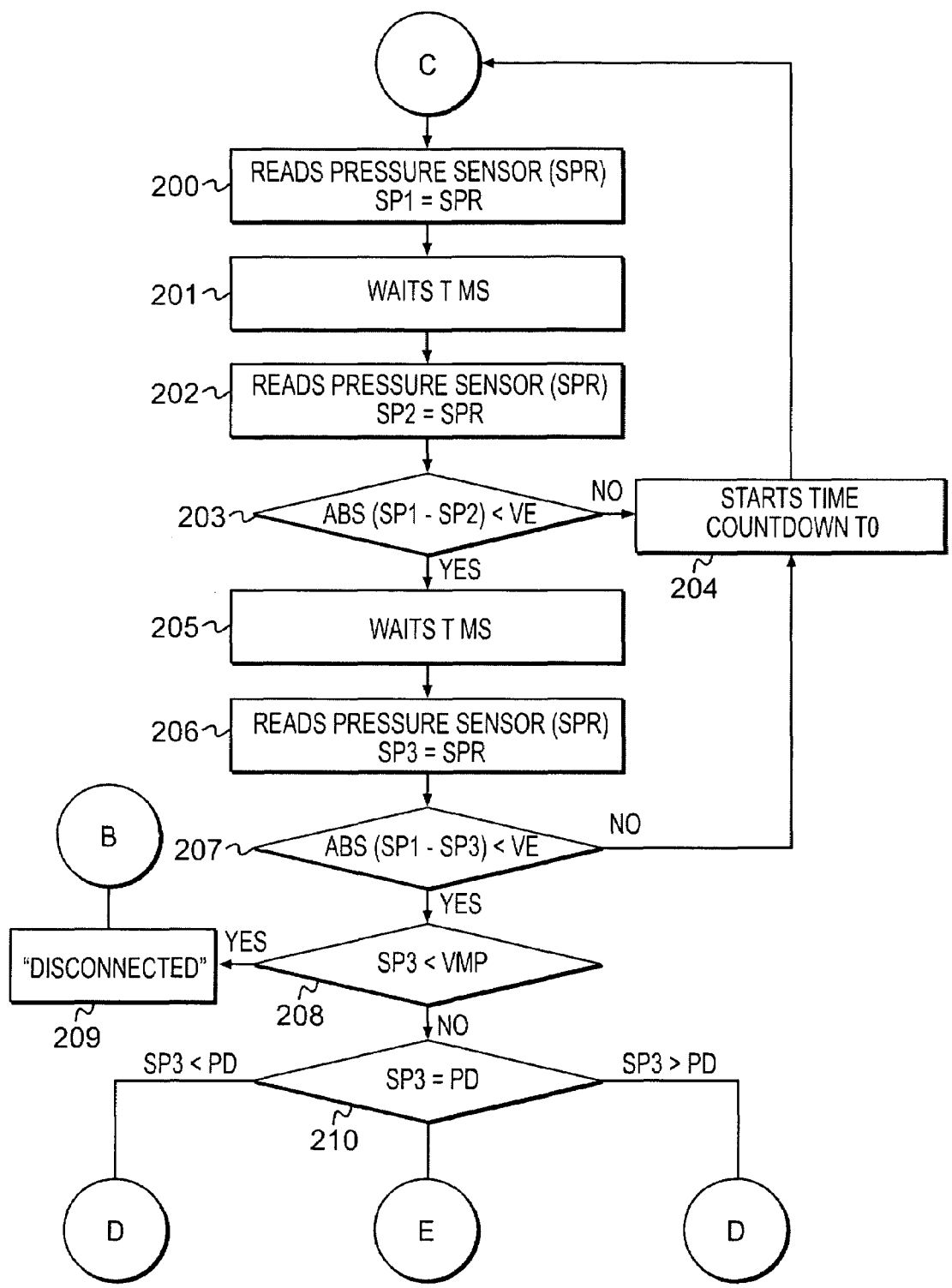
FIG. F4

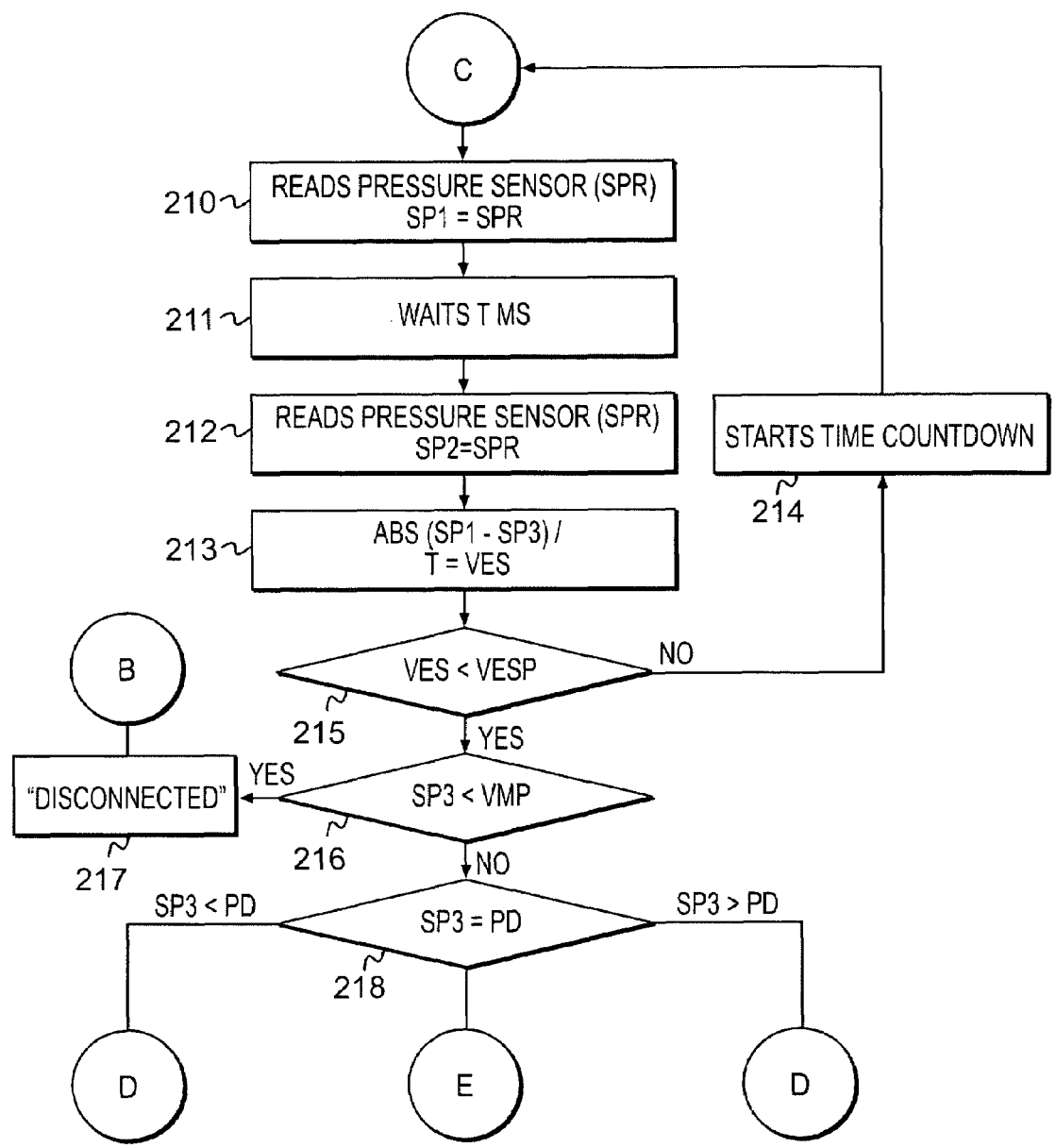
FIG. F4A

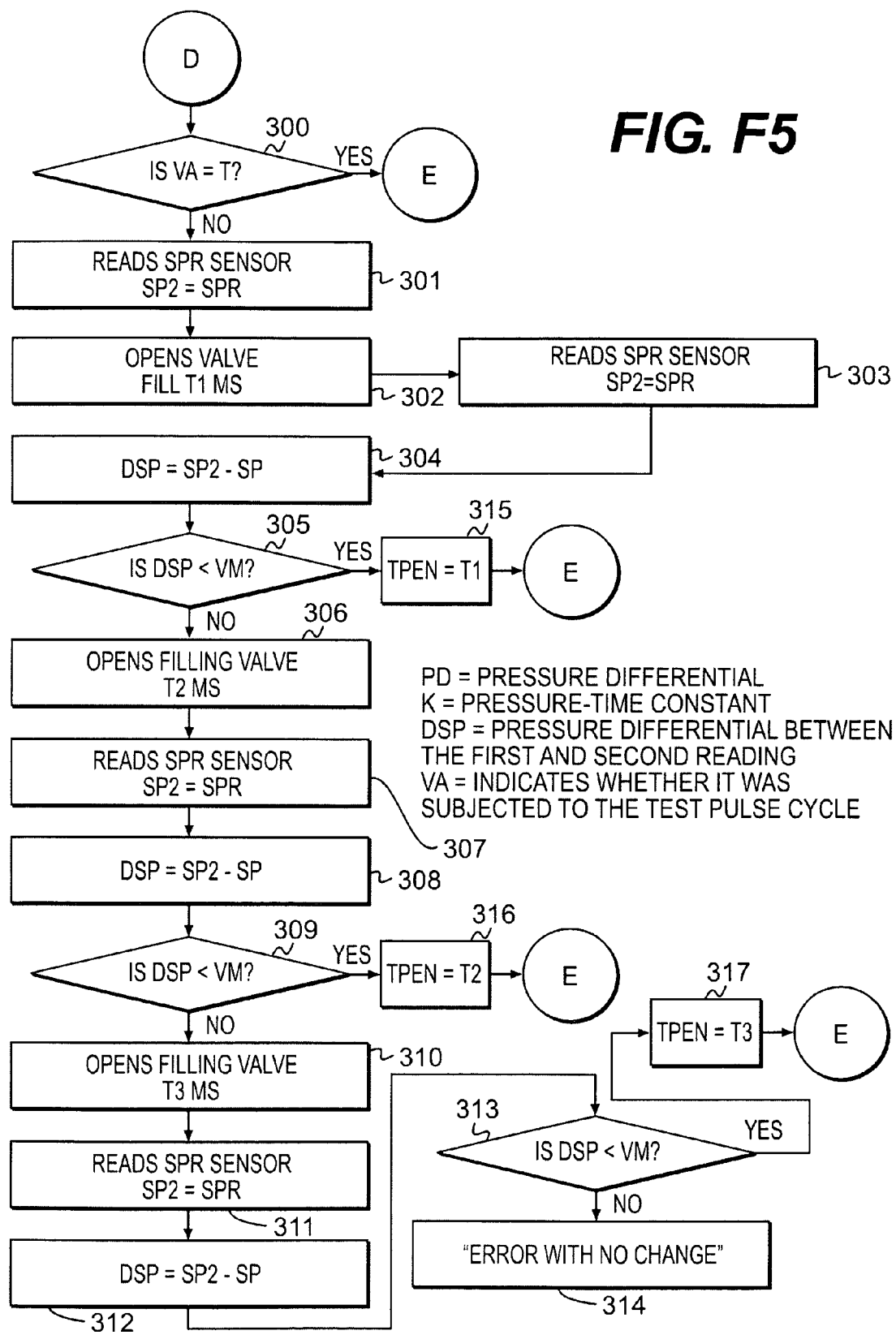
FIG. F5

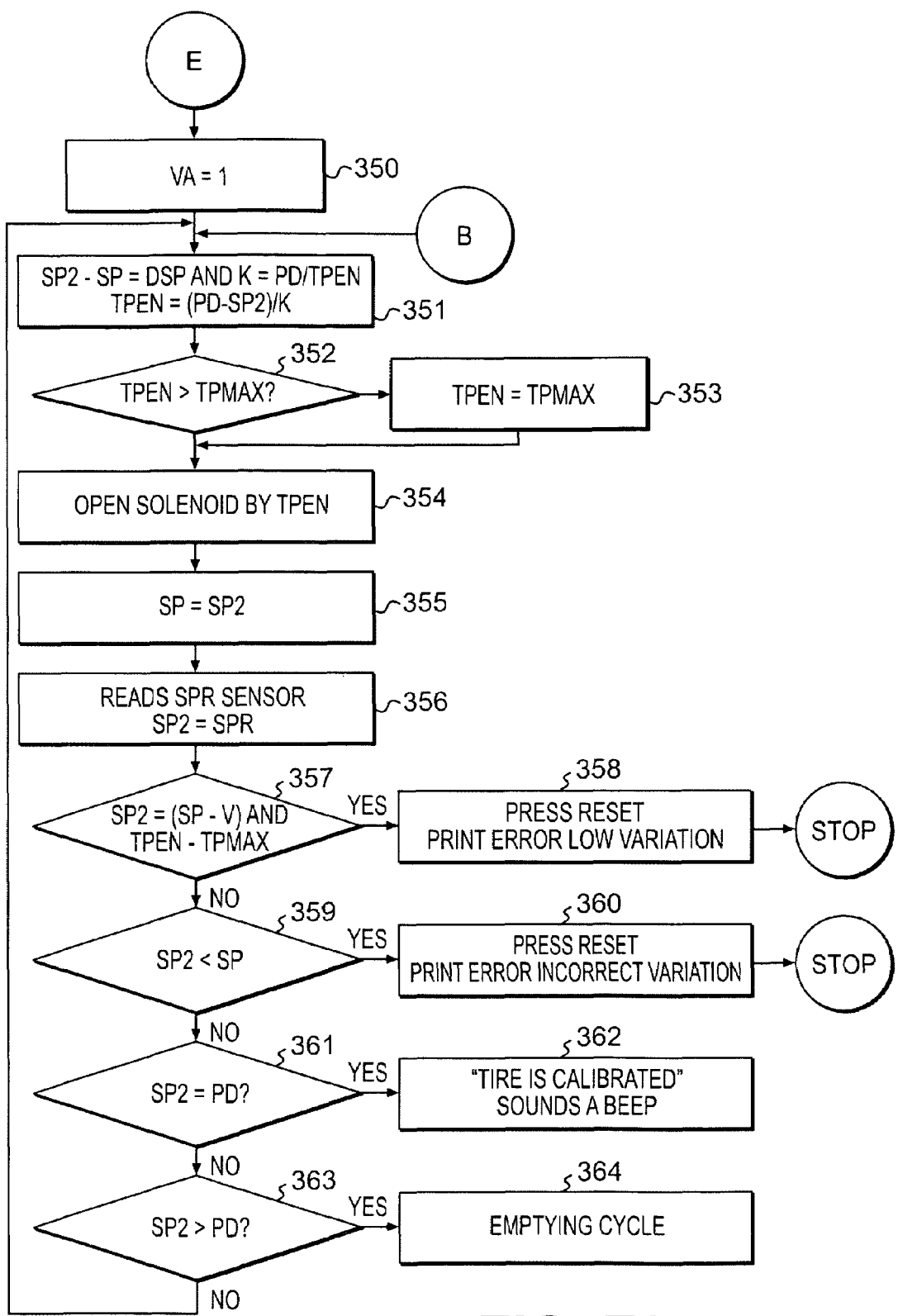
FIG. F6

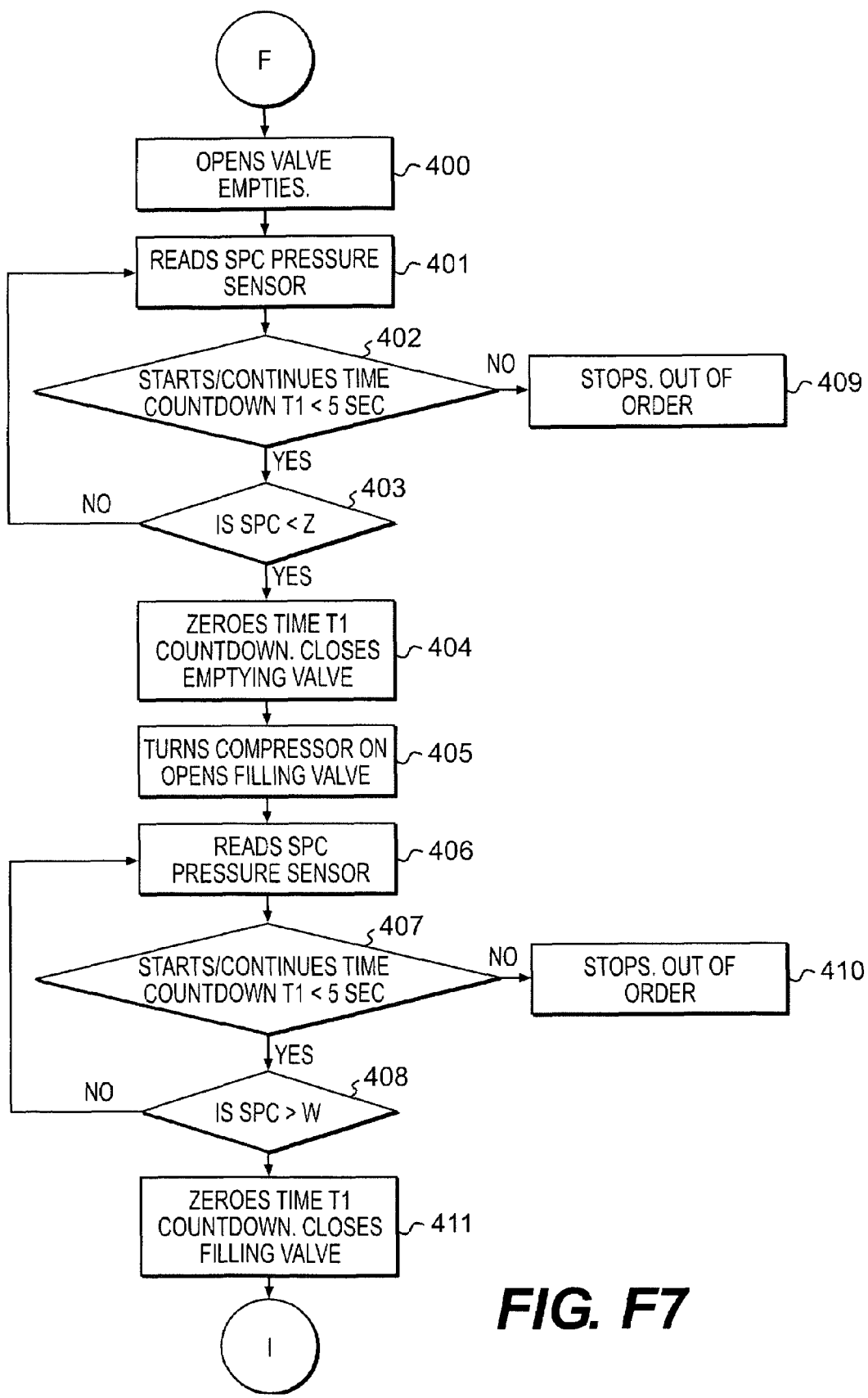
FIG. F7

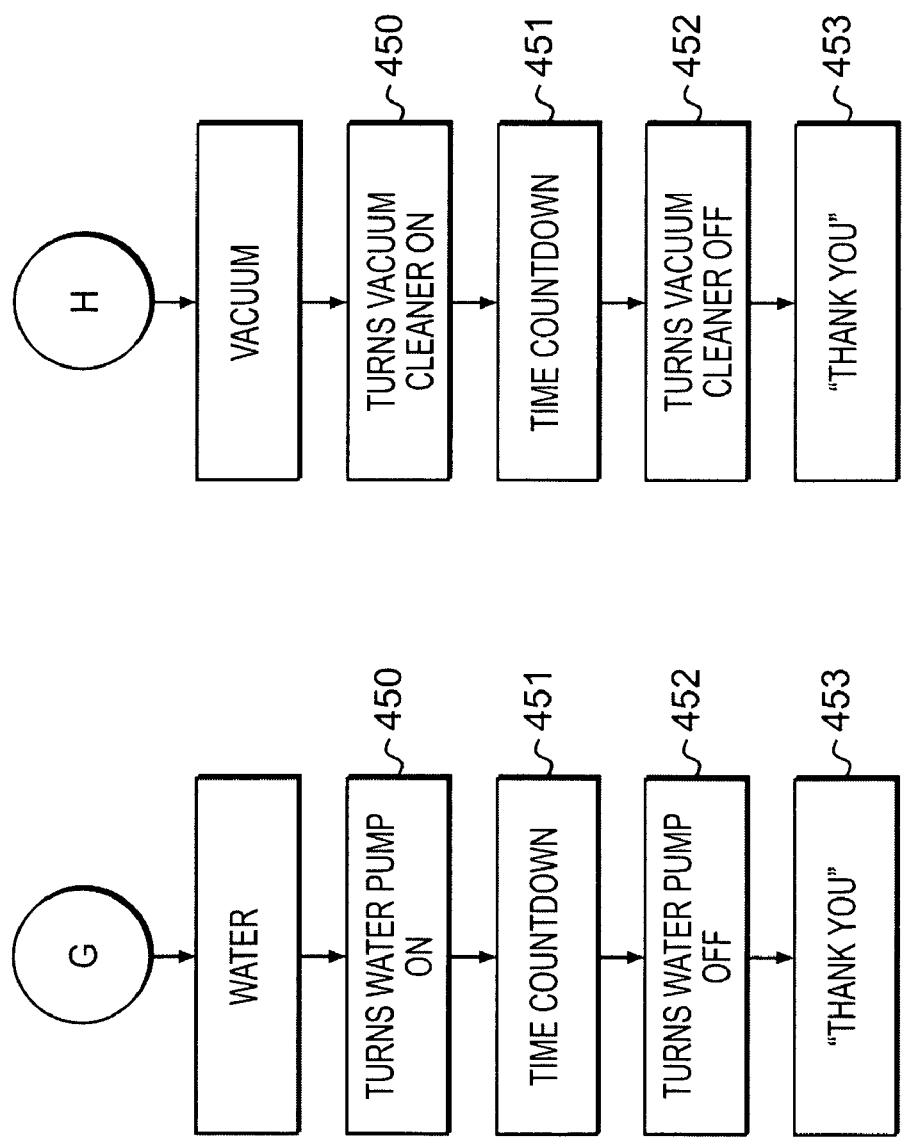

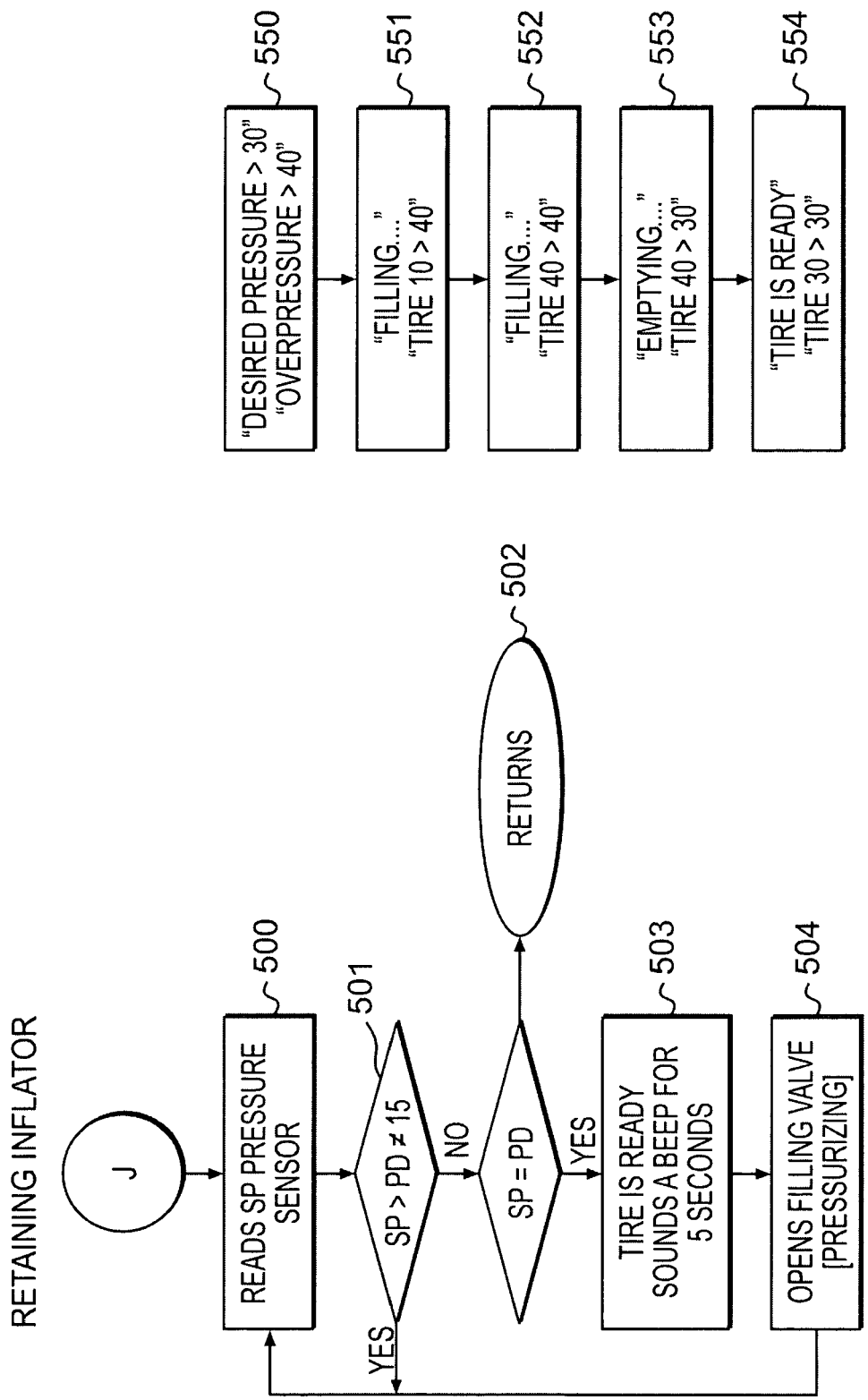

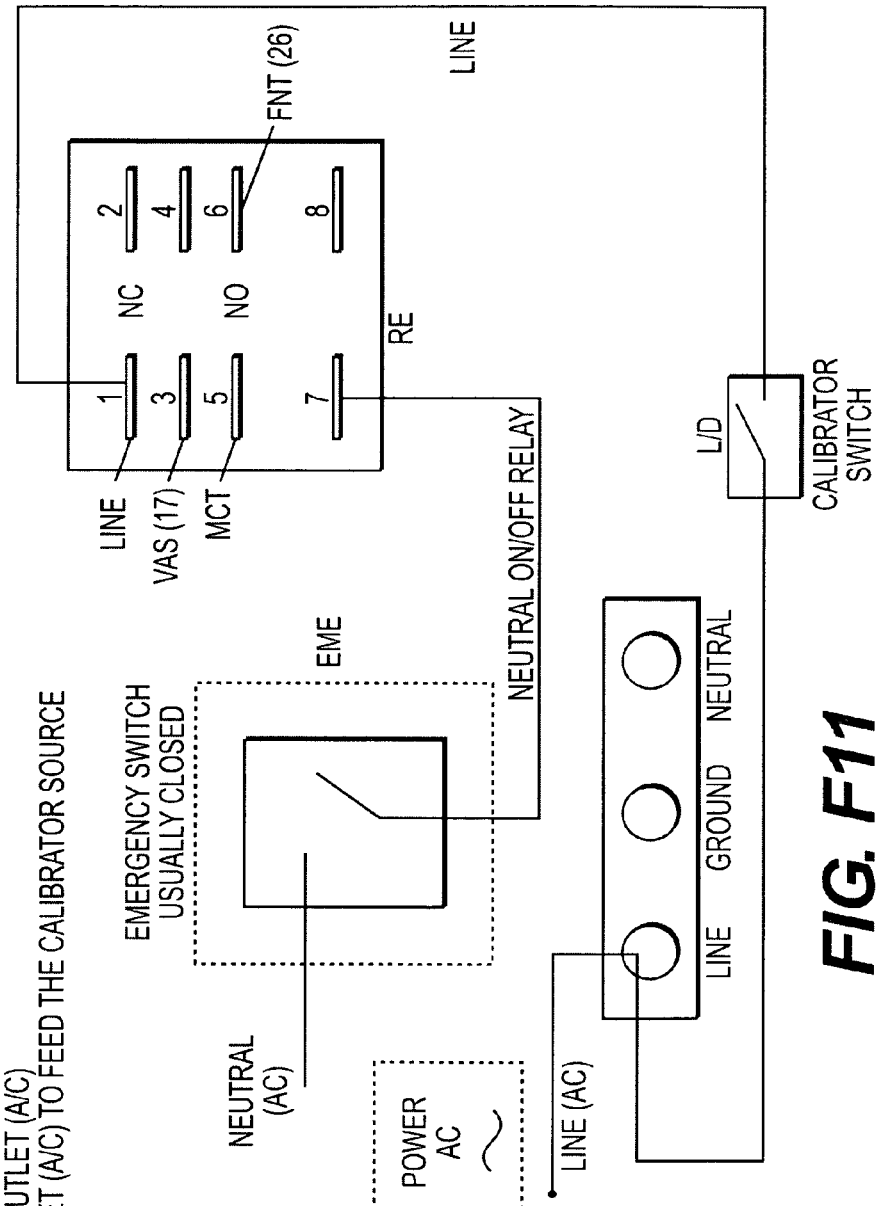
FIG. F11

COMPUTER CARD FOR ELECTRO-PNEUMATIC CALIBRATORS WITH SYSTEM MANAGEMENT

The present invention comprises an equipment to calibrate tires and similar inflatable objects. The purpose of the present invention is to provide an automated calibration process, of simple construction and with a safe and quick handling. The present invention is designed for use at service stations, tire repair shops, road transport companies and airports, serving vehicles in general vehicle, such as automobiles, buses, trucks, tractors, bicycles and motorcycles.

The electro-pneumatic calibrator equipped with the card (array of electronic circuits) of the present invention is fully automatic, as will be properly discussed later on, incorporating internal systems for quality assurance and essential electronic programming. Said characteristics make the calibrator equipped with the present invention's card more economic, versatile and practical, offering simple handling, in which the user only needs to dial the pressure value with which he intends to calibrate the tire.

DESCRIPTION OF THE STATE OF THE ART

The current state of the art may be assessed with the aid of several patent documents, among which some examples are:
"DISPOSITIVO ELETRÔNICO DE CALIBRAçÃO AUTOMÁTICA", Brazilian Patent PI-9307921-4, filed on Dec. 21, 1993;
"MICROPROCESSOR BASED AIR INFLATION CONTROL SYSTEM", U.S. Pat. No. 4,694,409, Sep. 15, 1987.

INCONVENIENCES OF THE STATE OF THE ART

Besides the applicability to tire calibrators, the present invention's card composes a system which evolved in such a way that it incorporates several other functions. However, bearing in mind that said function is its primary function and also the absence of devices which incorporate all the other functions of the present invention (which could offer grounds for a comparison), below are described the inconveniences found in the tire calibrators of the current state of the art.

The currently existing equipment are unsafe and imprecise due to the absence of safety systems and self-adjustment systems, as well as routines capable of inhibiting the errors caused by lack of experience or attention on the part of the user.

These are some of the problems associated with the use of the current state of the art equipment:

When the tire calibrating equipment is connected to a tire to be calibrated, the indication of the desired pressure value disappears from the display of the pressure value device indicator, so that after that the equipment indicates only the current tire pressure. The desired pressure value is only displayed again once the calibration process is over. Said disposition frequently causes accidents, in which typically a user instructs the equipment to calibrate a given tire with a relatively high-pressure value, for instance 85 pounds per square inch. The next user (or even a station employee) connects the calibration tip to a tire to be calibrated in another vehicle with a lower pressure value, failing to observe first the pressure value displayed in the equipment's display. As from the moment of connection of the tip to the tire said display shows only the current pressure value detected in the tire and hides the desired pressure value (85 pounds per square inch in this example), the system will keep on pressurizing the tire until it blows due to excessive pressure. Beyond the material damage, said typical accident may occasionally cause serious injury, specially to the hands and eyes of the user/employee.

Another problem of the systems of the current state of the art is the absence of a device which interrupts the pressurization without disconnecting the hose from the tire. In other words, once the operation of inflating or deflating a tire is initiated, there is no alternative mode to interrupt the calibration process.

Another problem of the systems of the current state of the art is the absence of real-time information regarding the operation of the calibrator. The user has no means to know whether the system is stopped, inflating or deflating the tire. Such inconvenience yields confusion, unnecessary process repetition and a major waste of time and energy.

Another problem of the systems of the current state of the art is the lack of interaction between the system and the user. The system does not indicate whether or not it is in normal operating conditions, does not indicate corrective measures upon the event of operational problems and/or mistakes on the part of the user, validity period of the system gauging, etc.

There is also a long list of additional inconveniences regarding the calibrating devices of the current state of the art, which detailed description would be exhaustive and unnecessary given the purpose of the present invention.

DESCRIPTION OF THE INVENTION AND ITS OPERATION

The calibrator equipped with the card of the present invention is fully automatic, for it incorporates electronic and pneumatic circuits, driven by and monitored by computer programs, which besides managing all of its functions, aggregates safety routines to verify occasional leaks or pressure peaks incompatible with the operational routine or with the tire to be calibrated, disconnecting itself completely and informing the user, through written and sound warnings, the event of said situations.

Besides commanding the airflow which enters or leaves the tire, the system is capable of controlling, testing, connecting, disconnecting and verifying the operational state of other equipment related to its operation.

For a better view of the present invention are presented the following figures, drawings or flowcharts herein described. It is worth observing that the purpose of said figures is merely illustrative, with no limiting or exclusive character whatsoever in the scope of the claimed privilege. Its function is simply to illustrate the basic conception of the present invention.

Figure 6:
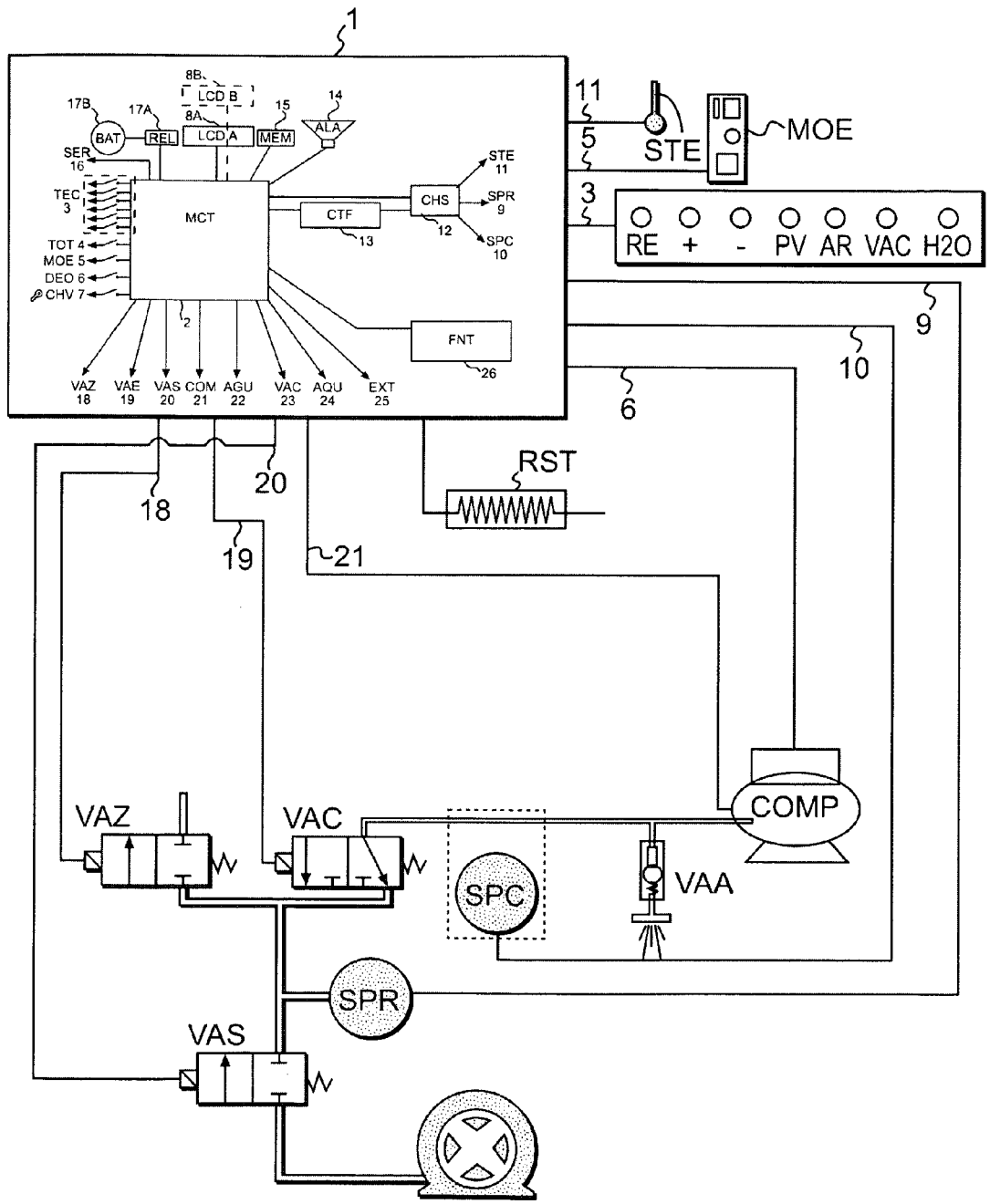
Figure 7:
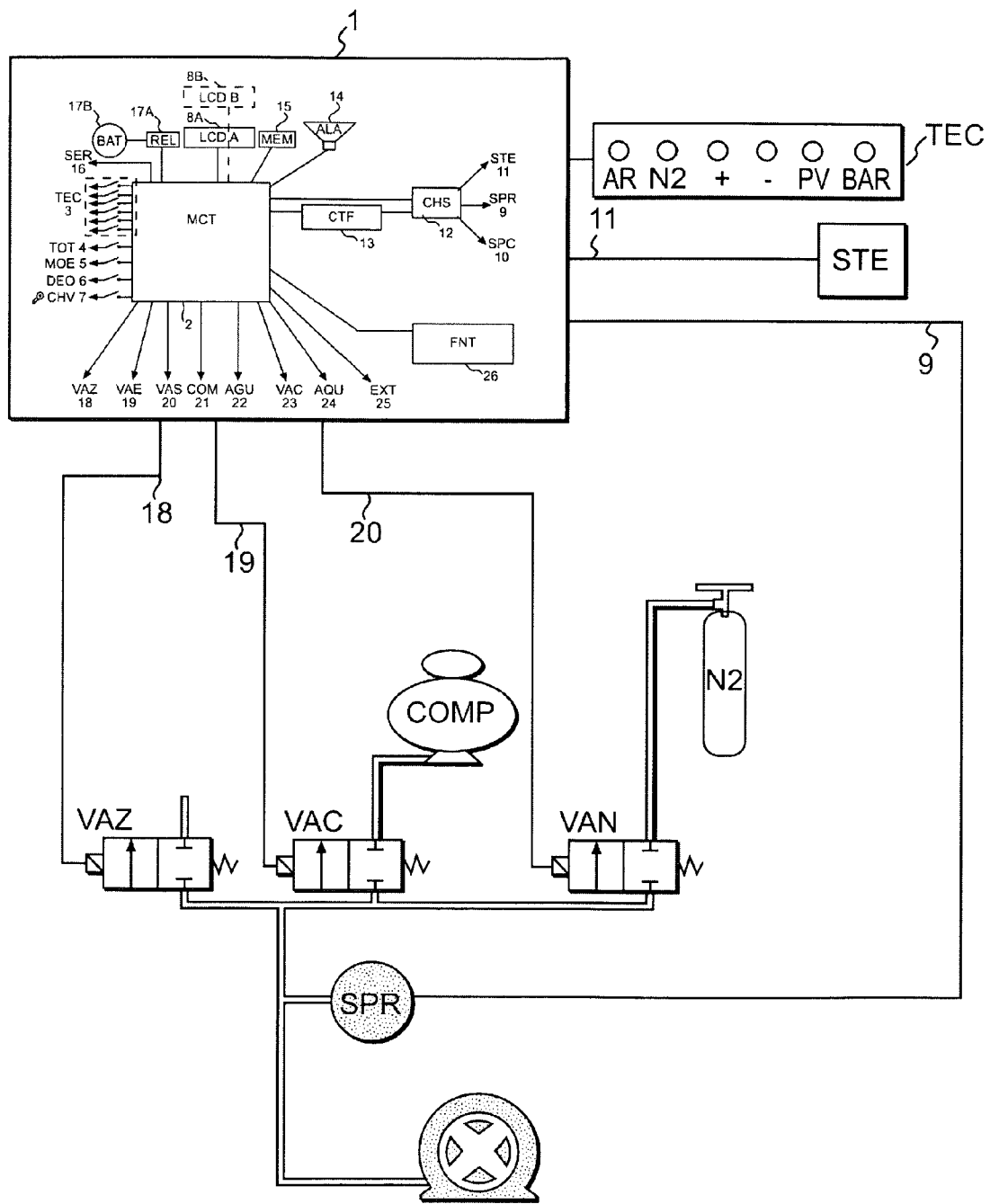
Figure 10:
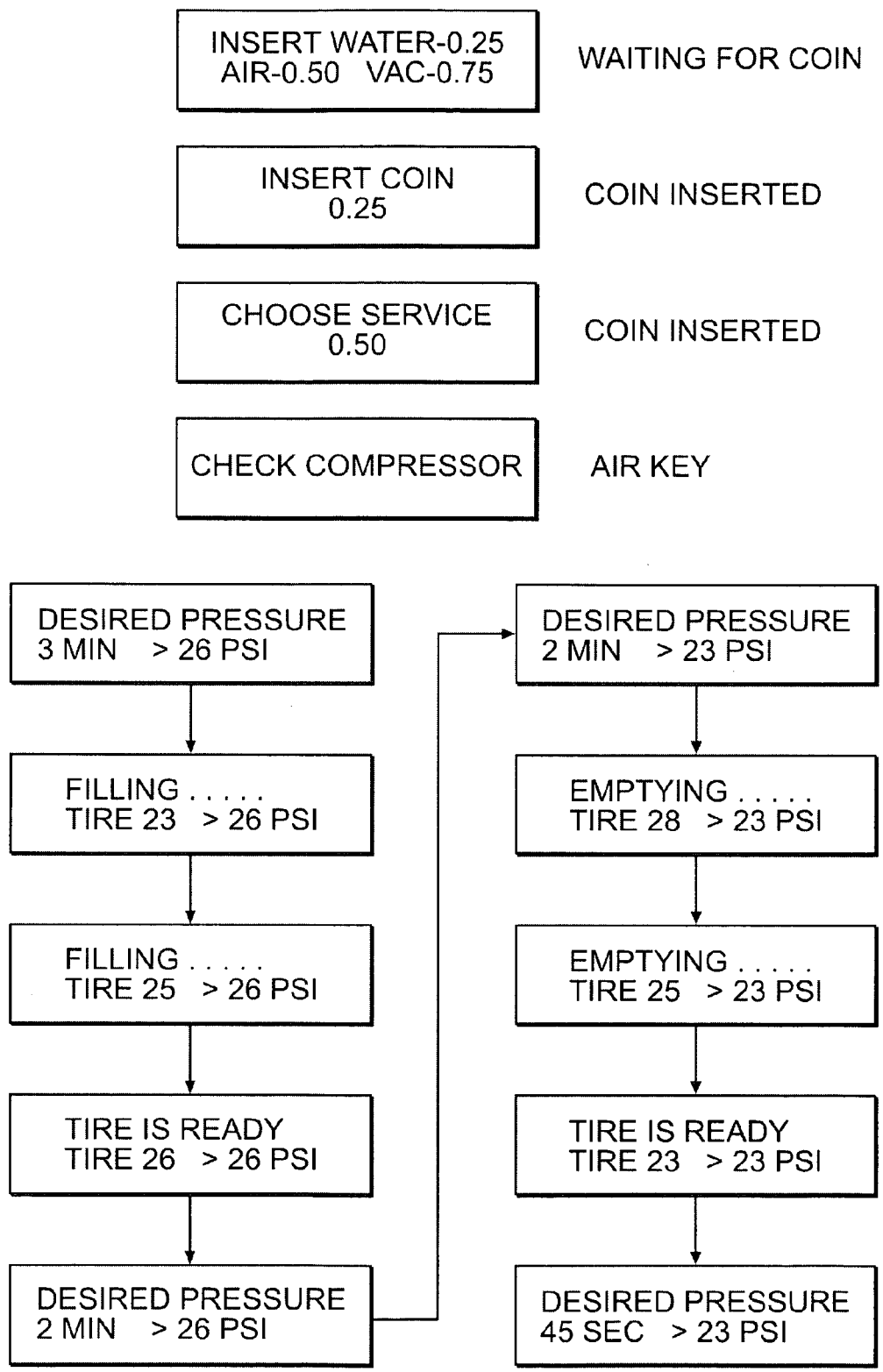

FIG. 6 also illustrates the system operated by token or coin, but with a change in the tire inflating VAC valve (19), which in this case presents 3 ways instead of 2, thus avoiding the heating of the compressor and affording it a longer service life;

FIG. 7 also illustrates a system operated with air and nitrogen;

FIG. 8 illustrates the use of the estimated or forecasted time for inflating or deflating the tire;

FIG. 9 illustrates the display of a paid system which offers air service;

FIG. 10 illustrates the display of a paid system with air, water and vacuum cleaner services using air;

FIG. 11 illustrates the display of a paid system with air, water and vacuum cleaner services using the vacuum cleaner;

FIG. 12 illustrates an example in are presented the TOTALS by means of the entering of a password, by means of a mathematic formula or any kind of combination, in order to check if the values such as the number of coins, date of withdrawal and other data were correctly registered, for they must match the password;

FIG. 13 displays the messages presented on the display for checking the gauging time limit, which are displayed some days before the corresponding deadline;

FIGS. 14A to 14Q illustrate the typical sequence of messages displayed on the liquid crystal display which equips the present invention, with a sequential referencing of the screens from FIG. 14O to FIG. 14Q;

FIG. F2 is a flowchart of the auto-reset test program of the equipment;

FIG. F3 is a flowchart of the program for detecting the air volume contained in the tire (examination to check if the tire is empty);

FIGS. F4 and F4a are flowcharts with alternative processing examples executed by the pressure stabilization control program on the set of calibrator, hose and tire;

FIG. F5 is a flowchart of the program that sets the base time for further calculation of the total inflating time or total deflating time of the tire;

FIG. F6 is a flowchart of the program that controls the inflating or deflating of the tire (the calibration itself), illustrating in this example the tire inflation operation;

FIG. F7 is a flowchart of the program that checks the compressor and the line, before the beginning of operations, prompted by the insertion of coins;

FIG. F8 is a diagram that shows on the display the use of other services such as WATER, vacuum cleaner, Shampoo, AIR, etc;

FIG. F9 is a flowchart of the program that commands the equipment, in the version in which said equipment features an air-retention tip;

FIG. F10 represents the screen display showing the sequence of messages shown to the user when the tire to be calibrated presents large dimensions (for example a tractor tire);

FIG. F11 shows a scheme of the connections of the HARDWARE EMERGENCY circuit;

Below is presented a more detailed description of the present invention components, with the aid of the previously described Figures.

Figure 1:
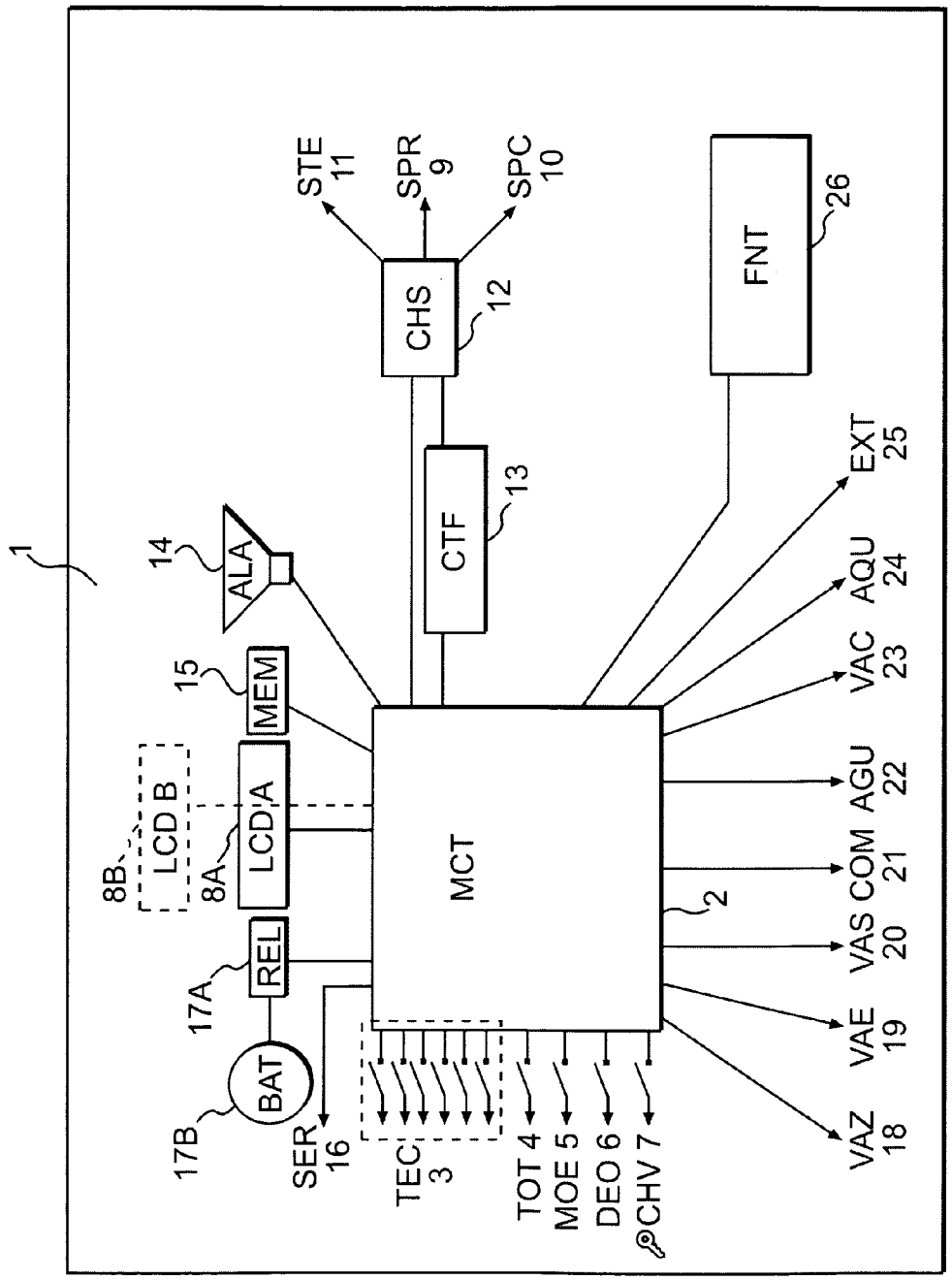
FIG. 1 is a schematic representation of the electronic card, illustrating its outputs and connection options and also indicating its main components.

We will start with a description of the main components of the electronic card seen through FIG. 1:

1—FIG. 1, Electronic card.

2—MCT, Microchip Controller. Controls the operational functions as well as manages the work areas.

3—TEC, keyboard. Allows communication through the keyboard, so that the user may choose among the several functions offered by the system, as for example air, water or vacuum; desired pressure, reinitialize, etc.

4—TOT, Totalizer. When pressed displays the data stored on memory (15), offering, for example, the number of times it was used, how many tires were calibrated, how many times were used the resources of water, vacuum cleaner, the number of coins inserted and the corresponding total amount, plus further information according to the program in force, to be described later on.

5—MOE, Coin box. Interprets he signal of the coin box when a coin is inserted.

6—DEO, Oil level detector. Allows the detection of the lubricating oil level for the compressor that serves the system.

7—CHV, System access. When pressed allows access to the system or the program data in order to change them, reconfigure the precision variable sets or execute the gauging in case it is necessary.

8—8A (LCD A), alphanumeric display. Displays all the operational information. There is an option for using a second display in parallel, herein designated by 8B (LCD B) which allows the operation according to the Dual Side® system, already covered by another patent application.

9—SPR, Tire pressure sensor. Detects and displays the value for the tire's internal pressure.

10—SPC, Compressor pressure sensor. Detects and displays the pressure value inside the air tank.

11—STE, Temperature sensor. Detects and displays the value of room or internal temperature of the equipment.

12—CHS, Selector key. Selects the sensors to be used.

13—CTF, Voltage/frequency converter. Converts the voltage signal read in Volts into a frequency value (HZ).

14—ALA, Alarm. Audio signal that identifies the end of a given operation or any other event that must be signaled.

15—MEM, Memory. Stores the operational and system data.

16—SER, Serial Output or Communication port. Used for data transmission or reception, being connectable to a modem, a printer, a serial cable, an infra-red transmission system, etc.

17—17A, Clock. Used for registering time and date. Numerical reference 17B indicates the clock battery.

18 to 25, High power outputs (AC). Allows the execution of a function, such as switching of valves or other equipment such as compressors, industrial vacuum cleaners, etc. The tire calibrators use outputs 18, 19 and 20, as described further below.

VAZ-18, Solenoid valve for deflating the tire. When switched allows the passage of air from the tire to the atmosphere, resulting in the deflating of the tire.

VAE-19, Solenoid tire inflating valve. Connected directly to the AIR line. When switched, allows the passage of air from the compressor to the tire, resulting in inflation of the tire.

VAS-20, Safety solenoid valve. The rest function of VAS-20 remains originally closed and opens only when switched on. This valve presents still safety function, i.e., being placed downstream of the tire inflating valves the VAS-20 interrupts the passage of air or any other gas in an occasional emergency such as loss of air coming from the compressor or if the tire inflating valve locks opened. Said configuration will be described with more details further below.

26—FNT, source. Conditions the entry signal to the voltages and specifications required for system operation.

Herein below are described the functions of the outputs and components of the present invention's card.

Outputs from 18 to 25 are denominated power outputs, because it is possible not only to connect to them the solenoid valves for inflating and deflating, but also to connect the remaining outputs to a compressor, a vacuum cleaner, a water pump, a purge to remove the condensation residues of the compressed air system, a fourth solenoid valve connected to a nitrogen cylinder for using this specific gas, and still internal heaters designed for places subjected to low temperatures that could compromise the systems operation. In this case is used the temperature output duly connected to a temperature sensor to effect the reading.

The switcher 12 allows the switching between the signals of several sensors, which in the case illustrated are the pressure SPR sensor (9), the compressor pressure SPC sensor (10) and the temperature sensor STE (11). Said switching allows the system not only to read the tire pressure value but also read the air line pressure, switching the compressor on and off once reached the previously programmed pressure values or whenever necessary according to the installed program. Therefore it is possible to set the use conditions in real time, avoiding excessive heating by means of controlling the engine operation time, and still set the volume of air used, calculating the average that determines the operational limit pressures, saving energy.

For those services charged it is possible to use the power outputs to command the operation of external resources such as a vacuum cleaner for vehicle cleaning, an opening valve for water, a deodorizer, etc. in case the purpose is to charge the user for the service, it is necessary to define some sort of identification element connected to the coins or bills collector (5). Said element may for example be a system operated by remote control, which only enables the use of the resource once the payment of the corresponding value is detected.

It is worth noting that all the functions described hereinabove are controlled by the Microchip Controller (2) in which the software is recorded. All the operational variables, registers and data are calculated during the use of the offered services are duly registered on memory (15) of the Microchip Controller (2).

FIG. 11 illustrates an event of simultaneous use of multiple services, with the displayed message sequence from the insertion of coins until the choice of the service (for example air).

Besides indicating the day, the hour and the temperature, the alphanumeric display (8A) has as main function communicate to the user the required instructions for system use, such as: Press reset, Press start, Inflating, Deflating, Tire Ready, current pressure and desired pressure (simultaneously), estimated time for inflating, original pressure once the calibration process is over, etc., as well as the error messages, operational procedures, emergencies and failures such as: Disconnect Tire, No Pressure Change, No Tire Detected, Auto zero error, Pressure error, No air, Out of service, Leaking tip, Check oil, etc. The alphanumeric display (8A) also communicates the management messages such as Insert Coin, US$ 0.25, water on, vacuum cleaner on, remaining time, 3 min, Thank you, etc. It also communicates the balance values, such as the number inserted coins, the number of calibrated tires, the number de vacuum cleaner uses, Total, Grand Total, etc.

Besides the alphanumeric display (8A) output, preferably with 32 or more, the present invention features also a second parallel display output, to which is connected a second display (8B) that configures the Dual Side® version. Said Dual Side® version corresponds to a double face calibrator, presenting a keyboard on each of these faces. Said version is specially adequate for use on pump isles, and the Dual Side® standard has been the object of a patent application some years ago.

As the vast majority of electro-mechanical machines, the compressor equipping the present invention relies on the lubrication of its moving parts to operate normally. Given the importance of the compressor operation for the performance of the system of the present invention, it is very important to control the compressor lubrication conditions. In the present invention, the compressor features a sensor that detects the lubricating oil level. Said oil sensor is installed in the compressor and is connected to the output for identification and oil level (6). When the MCT prompts the output (6) for a signal, the sensor connected to it informs whether the oil level in the reservoir is sufficient. In case it is not, the MCT (2) turns off the system and sends a message to the display (8) requesting the checking or replacement of the lubricating oil, as illustrated on FIG. Q.

Output 3 encompasses a set of several outputs that allow the connection of a keyboard (3) necessary for the whole system operation.

Output 4 of the present invention's card is associated to a system for controlling the use of those resources offered to the user. Once the output TOT (4) receives a signal, MCT (2) transmits the data (number of tires, etc.) stored in memory MEM (15) to the display (8a). said output TOT (4) registers the money amount stored inside the safe, the number of times each one of the resources was used, the number of coins inserted, the number de tires calibrated, the number de vacuum cleaner use cycles, Total, Grand Total, etc. When pressed, the key corresponding to output 4 causes the display to indicate the amount of money stored in the machine and the number of usage cycles of each service, allowing also the reset or "zeroing" of said registers by pressing the Reset key. However it is not possible to reset the Grand Total register.

Output 7 was designed to control access to the system parameters. The access to this output must be blocked by means of a mechanical lock placed in a hard to reach position, or else by means of an electric button locked by a key, because when accessed the output 7 allows the changing of system adjustment parameters for an occasional gauging, check-up, usage times change, value and number of coins to be charged for the use of each one of the resources offered, etc. said data are also stored in the memory (15).

The CTF (13) voltage/frequency converter converts the reading of the voltage sensors into HZ, with two significative advantages:

Besides costing less than the typical AD converter (analog/digital) used in systems that usually do this kind of reading, the voltage/frequency converter allows for a much better resolution rate, because it converts a signal from 0 to 5 Volts into one of from 0 to 30.000 HZ, using the Microchip Controller's frequency input. For example:

An 8 Bits AD controller would correspond to a scale with 256 divisions, of 10 bits 1024.

The voltage/frequency converter of the present invention presents 30,000 divisions, and thus for a pressure limit of 180 PSI yields a resolution of 180/30,000=0.006 PSI. Furthermore, the voltage/frequency converter of the present invention uses only 2 pins (frequency serial input) of the MCT (2) in order to establish the connection, leaving a higher number of outputs free for the other system functions, instead of using 8 or 10 pins as would be the case for the example of use of an AD converter with parallel outputs. The alternative to the use of serial AD converters presents the inconvenience of high unitary cost of this kind of signal converter.

The functions of the REL clock (17A) are not limited to presenting the day, month, year and hour, covering also the following:

1—After payment or insertion of coins, the clock is used to register the time of use. Once this expires, the system turns itself off or disconnects the output that is being used.

2—Upon opening of the safe, the clock indicates the day and the hour to be stored in memory MEM (15). This registry is important to record when the money was withdrawn by the last time.

3—The internal clock REL (17A) allows the system to inform, in cases of periodical gauging (see FIG. 13), if the last calibration is expired. The clock reports the expiration 15 days before it shuts the system off completely. A control imposed by norms such as ISO 9000 or similar can set a maximum period of time between consecutive gauging operations, and the clock ensures that such control may be implemented.

4—In the remote models in which data transmission is used, the advent of the clock allows the scheduling of the periodical date and hour of the transmissions, enabling the selection of more suitable hours according to rate seasonality and other operational parameters.

5—The REL internal clock (17A) is used for controlling the interval and duration time of the drainage in the electronic purges.

The remarkable system flexibility will show in other advantages of the internal clock.

Obs.: In the case where the system remains turned off during extended periods of time, the REL internal clock (17A) has its own battery BAT (17B) that keeps it working.

The function of output (11) connected to temperature sensor STE (11) is to enable the gauging of the system internal temperature. When the system is used in cold places where extremely low temperatures are reached, the temperature sensor STE (11) switches on an electric heater that heats the inside of the equipment preventing that, upon reaching a previously set temperature limit value, the equipment stops working or develop faults. In places of less harsh climate said resource can be used to measure the room temperature.

The Serial Output (16) of Microchip Controller MCT (2) is used for transmitting and receiving data, as operational inventory, software corrections or changes, system operational checking, occasional error message, stored or uploaded values checking, etc. The Serial Output (16) may be connected to the network, to the modem, to a printer, etc. This resource allows the remote control of the whole system with no need of local physical interference.

Figure 2:
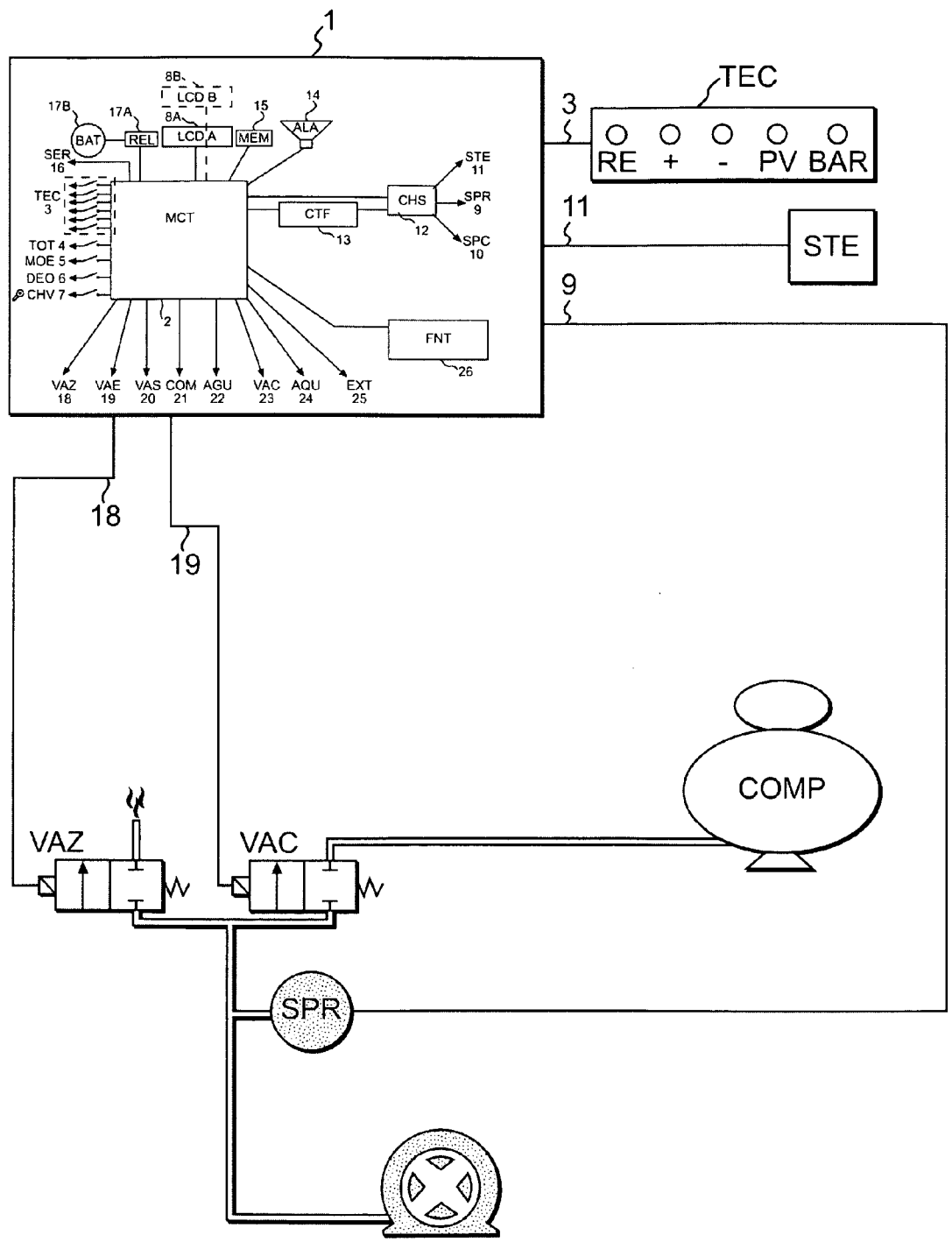
FIG. 2 illustrates the so called Basic Version, in a schematic representation of the use of the PLE—electronic card in a basic configuration of the equipment, with its main components.

FIG. 2, denominated Basic version, is the schematic representation of the use of PLE electronic card in a basic configuration of the equipment, identifying its main components.

Outputs 18 and 19 of the present invention's card are used for driving the valves to inflate and deflate tires, respectively. Output 3 corresponds to a keyboard connection, output 9 corresponds to a pressure sensor and output 11 corresponds to a temperature sensor.

One of the most important components of the electronic card of the present invention is the MCT or Microchip Controller (2), where all the system programs are stored. When the system is turned on, the Microchip Controller (2) comments, monitors and controls all the remaining components and their respective functions.

Connected to output (3), the keyboard features specific function keys. The RESET (RE) key has a multiple function, serving either to initialize the use and leave the stand-by mode or to interrupt the current program execution and cause the alphanumeric display (8A) to display once more the standard functions previously defined by the program, returning to the stand-by mode. The PVA key is only used for completely empty tires. When pressed, the PVA key prompts the MCT (2) to generate consecutive air pulses. The + and − keys serve respectively to increase and decrease the selected pressure value. The EME-emergency key interrupts any operation.

Output 19 serves to command the airflow to a tire to be calibrated. When pressed, it commands the opening of a tire inflating VAC valve during a certain period of time, causing the air contained in the compressor reservoir to escape to the hose and thus reach the interior of the tire to be calibrated.

Output 18 has a function analogous to output 19, but it serves to deflate the tire instead of inflate it. The reading of the tire pressure value is executed by the SPR sensor (9) connected to output 9.

OPERATIONAL EXAMPLES

Upon being turned on, the equipment is on the stand-by mode, displaying the message "Press reset", as indicated on FIG. A. even if the hose is correctly connected to the tire, the system will only be activated when the RESET key is pressed.

Once the RESET key is pressed, the system leaves the stand-by mode, passing to the adjust mode, already assuming as initial calibrating value the default pressure of 26 PSI. at this moment the display (8a) displays the following message: "Desired pressure=26 PSI", as shown on FIG. B.

If the desired pressure value for the calibration operation is different from the initial default value of 26 PSI, the user must press the + and − keys to increase or decrease the calibration value.

Once the calibration pressure value is selected, the connection of the hose to the tire causes the system to initiate the calibration process. Once said connection is established, the pressure SPR sensor (9) starts reading the current pressure value inside the tire and relay this data to the Microchip Controller MCT (2), which in turn processes said information comparing it to the calibration pressure value selected by the user according to the example illustrated on FIG. C. If this calibration pressure value selected by the user is less than the one detected inside the tire, the MCT (2) switches on the tire inflating valve VAE (19) for a certain period of time. If on the contrary the pressure value detected inside the tire is higher than the calibration value, the MCT (2) switches on the deflating valve VAZ (18). If the pressure value detected inside the tire is equal to the one selected for the calibration operation, the MCT (2) activates the audio signal ALA (14). Said process is repeated until the selected calibration pressure is reached, when the equality between the calibration pressure and the pressure detected inside the tire cause the MCT (2) to sound the audio signal ALA (14).

In order to establish whether the compressor pressure is sufficient to inflate the tire, the following routine is executed: when the inflation valve is open, the MCT (2) commands the reading of pressure SPR sensor (9), storing the yielded data. Once said pulse is over, the MCT (2) commands the reading of the pressure sensor and compares the yielded data with the previous one. If the last detected value is equal or higher than the previous one (that means, the tire presents a pressure value higher than the one detected in the line) there is no sufficient pressure, which causes the MCT (2) to send to display (8a) the message "verify tank".

A more detailed explanation of the tire inflating and deflating routines will be presented further below.

The system basic version includes also an optional resource to indicate the estimated required time for inflating or deflating the tire, readjusting on each pulse. This function becomes more important when the tires to be calibrated feature big volume, such as the tires equipping trucks or tractors. In these cases the inflating time is considerably longer. A corresponding example is illustrated on FIG. 8.

The system basic version also includes a totalize key TOT (4) and a program key CHV (7).

The switching of the TOT (4) key causes the display of the total of used services, the number of calibrated tires and the number of empty tires, plus an indicative register of the number of times error messages were displayed and exactly which was the content of each one of these messages.

The key (7) serves to allow access to the adjust mode and system gauging, enabling the changing of pressure patterns, fixing of pressure calibration errors, temperature, etc.

Safety System

Upon switching the equipment on, the system enters the stand-by mode, displaying the message "Press reset" as shown on FIG. A.

Even if the user connects the hose to the tire before pressing the RESET key, the SPR sensor (9) detects a pressure value inside the hose, reporting said event to the MCT (2). In turn the MCT (2) processes said information and displays the messages "DISCONNECT TIRE" and "PRESS RESET", and also sounds the audio signal ALA (14).

This way, before connecting the hose to the tire the user is forced to confirm or change the desired pressure value shown on the alphanumeric display (8a), and only then connect the hose to the tire. Said operational scheme forces the user to interact with the system, not only connecting the hose to the tire, but also following up the messages issued by the system.

Once the hose is dully connected to tire, the switching of the RESET key generates on the alphanumeric display (8a) the message "Desired pressure=26 PSI" as shown on FIG. B. It is worth remembering that the first pressure value displayed is the default or standard pressure of 26 PSI. The design of the present invention assumes that this standard value is safe for use in conventional tires for passenger vehicles, not causing any risk in the hypothesis of a user connecting the hose to the tire without knowing the exact calibration value indicated for that particular tire. Said standard value of 26 PSI may be changed according to each application.

As previously explained, the + or − keys allow the modification of the pressure value. The alphanumeric display (8a) displays the desired calibration pressure value, the current pressure value in the tire and the estimated time for finishing the operation. Once the operation is finished, the display indicates "Tire Ready" and the system sounds the audio signal ALA (14). This sequence of messages allow the user to follow up the whole calibration process.

After 1 minute and 30 seconds without use, or with no key pressed, the system goes back to the stand-by mode (FIG. A), with the alphanumeric display (8a) displaying the initial screen with the message "Press reset". This time interval of 1 minute and 30 seconds may be changed also according to necessity. The next user using the system must press the RESET key once again, reinitializing the calibration value as 26 PSI, a value deemed safe from the operational point of view. Said operational scheme tends to prevent inattentive or uninformed users from making the mistake of connecting the hose to the tire when the calibrator is set for a calibration value unsuited for the tire this user wished to calibrate. Besides the "PRESS RESET" message displayed on the stand-by mode, the alphanumeric display (8a) may also display the date, the hour and the room temperature, as well as advertisement or educational messages.

The Emergency Standard System, developed to interrupt the machine operation and automatically empty the tire, with no need for the user to get close to the tire to disconnect the hose, keeps the user away from the tire, which fosters safety in the case of blowing a tire due to exaggerated pressure or tire failure. If any key in the keyboard (3) is pressed when the hose is connected to tire and the calibrator is in use (either inflating or deflating a tire), the Emergency Standard System interrupts the process, automatically activating the deflating valve VAZ (18), deflating the tire and sounding the ALA (14). In this situation the alphanumeric display (8a) displays the message illustrated on FIG. J.

Figure 3:
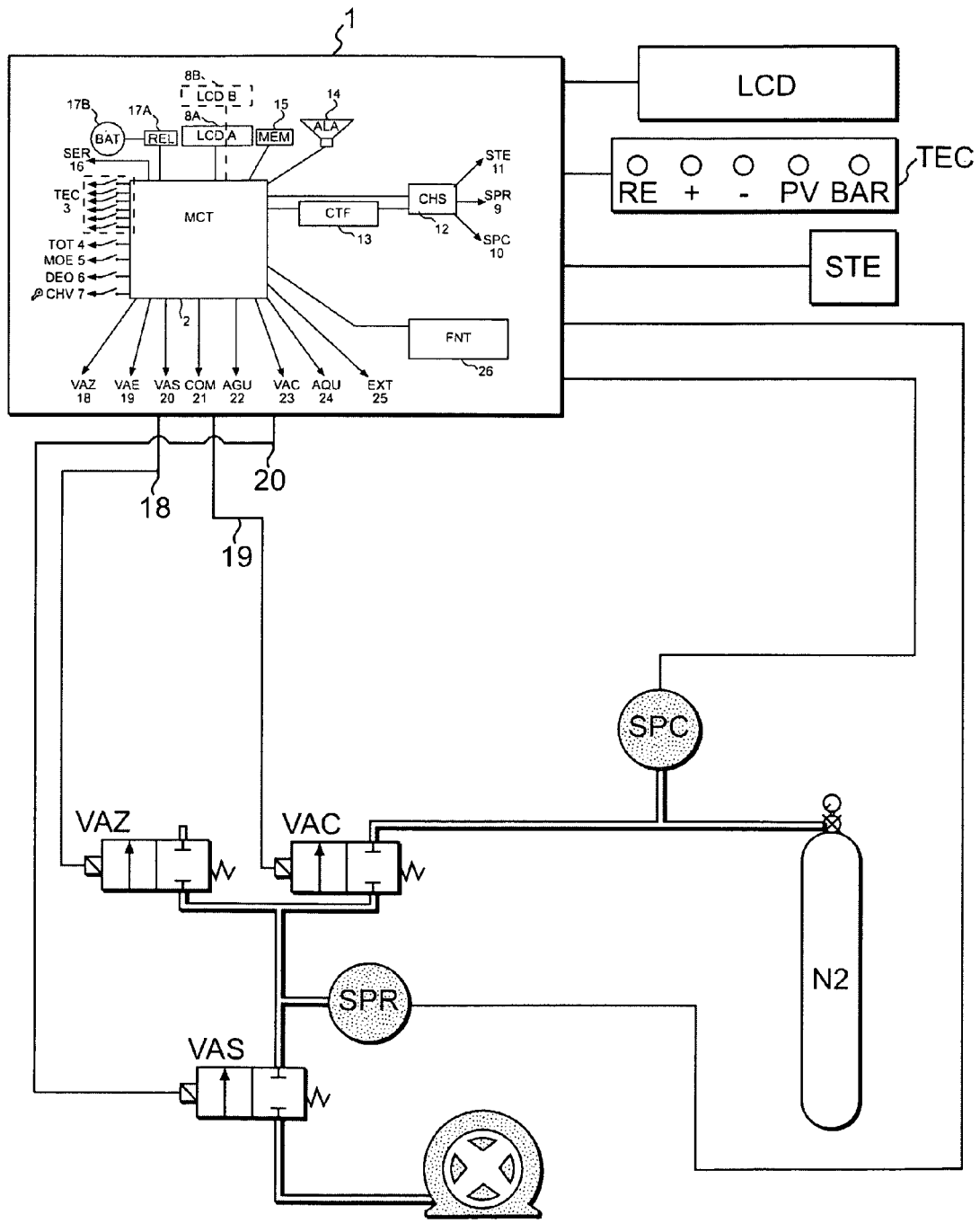
FIG. 3 illustrates a third valve connected, denominated safety solenoid valve, which function is to block the passage of the airflow going to the tire.

FIG. 3 illustrates the third valve controlled also by the MCT (2), connected to the output VAS (20), denominated safety solenoid valve. This serves to block the passage to the tire. If the valve for inflating or deflating the tire locks in the open position, said safety solenoid valve closes automatically, avoiding an explosion or total deflating of the tire.

Said system was developed also for calibration aircraft tires, which calibration pressures are very high, reaching 275 PSI and more. It is worth noting that in these cases Nitrogen cylinders are used to inflate and calibrate the tires with entry pressures in the order of 350 to 400 PSI and more.

The SPC sensor (10) is used for detecting the pressure value in the nitrogen line. Said detection signals the need for changing the nitrogen cylinders when these present insufficient pressure to inflate the tires.

In the diagram of FIG. 3 the SPC (10) becomes optional in case there are valve VAS (20), sufficing only opening the tire inflating valve VAE (19). The closing of VAS safety valve (20) and VAZ (18) allows the reading of the air line pressure value.

The output 10 can be used for connecting a high-pressure sensor, for pressures in the order of 4,000 PSI, which purpose is to check the emergency system pressure in aircraft. The aircraft emergency system is supplied with nitrogen by means of a multiplier connected to the same cylinder that supplies nitrogen to the aircraft's tanks, with pressures around 3,000 PSI. This way, besides ensuring the safety of the tire, the system also offers the pressure reading resource in the landing gear systems, brake systems, etc, making use of the existing resource of pressure reading, already inbuilt in the calibrator.

Figure 4:
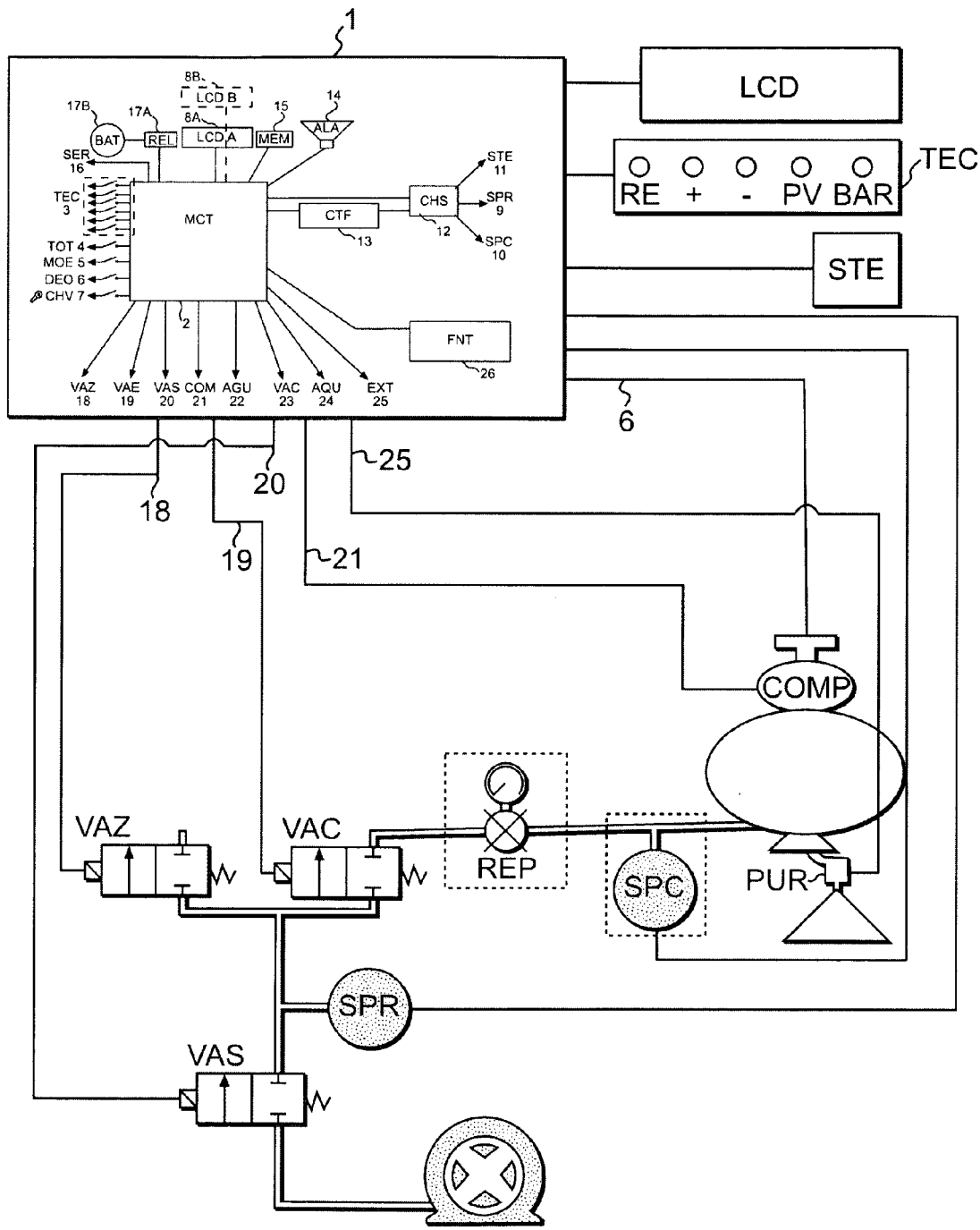
FIG. 4 illustrates the complete version, which controls and manages the compressed air from the compressor and its peripherals, such as the purge, the oil level detector, etc., besides calibrating the tire.

FIG. 4 illustrates the complete version for use in tire assembly shops, dealers, etc. besides calibrating tires, the complete version can also manage the line. Said complete version system controls the compressed airflow coming from the compressor, manages the compressor and also its peripheral devices, such as the purge and the oil level detector.

Outputs 18 and 19 serve for deflating and inflating the tire. Output 20 activates the third solenoid valve denominated safety solenoid valve, already described before.

Output 21 controlled by MCT (2) turns on or off the compressor according to the readings of the SPC pressure sensor (10). In this case the user can program the tank minimum and maximum limit pressures for turning on the compressor, enabling operation optimization according to the conditions of use, saving energy, fostering a longer service life for the compressor and lowering the temperature during operation. Whit that, besides programming the limit pressures, it is also possible to program the maximum time during which the engine may function, reducing the system's wear. It is also possible to optimize the system operational limit pressures according to its consumption, providing an optimized use of the compressor and therefore saving energy.

The present invention system's complete version uses the power output 25 to drive the special solenoid valve that serves to drain the compressor tank, eliminating the condensation residues and filth. Said function provides an electronic purge to the system, which can be used in the lower output of the compressor air tank. This same purge can also be used in filters, dryers, separators for condensation residues, air networks, etc., replacing the buoy or thermodynamic purges.

In the case of use of the purge to execute the drainage, the MCT (2) uses the information yielded by the clock and the users instructions to command the opening and closing of the drainage valve, acting as a timer and controlling the drainage interval and duration. Said instructions are previously programmed by the user. The drainage operation can be scheduled as a function of the detection of certain pressure values, or immediately after the compressor pressurization cycle, or even letting pass a certain period of time to allow for temperature stabilization, enabling the formation of the condensation residues inside the tank with the purpose of making its drainage easier.

The temperature sensor can also be used for detecting the temperature value inside the tank. Along with the internal pressure data and the time data, the temperature value inside the tank sets the three parameters that define the ideal conditions for forming the condensation residues. Said conditions define the ideal moment for switching on the system's electronic purge, although a less precise control based solely on the time data is also viable. The use of the temperature sensor offers a good example of optimization revealed by the present invention, offering a scope of services much wider that the one offered by a mere tire calibrator such as those presently found in the state of the art.

Figure 5:
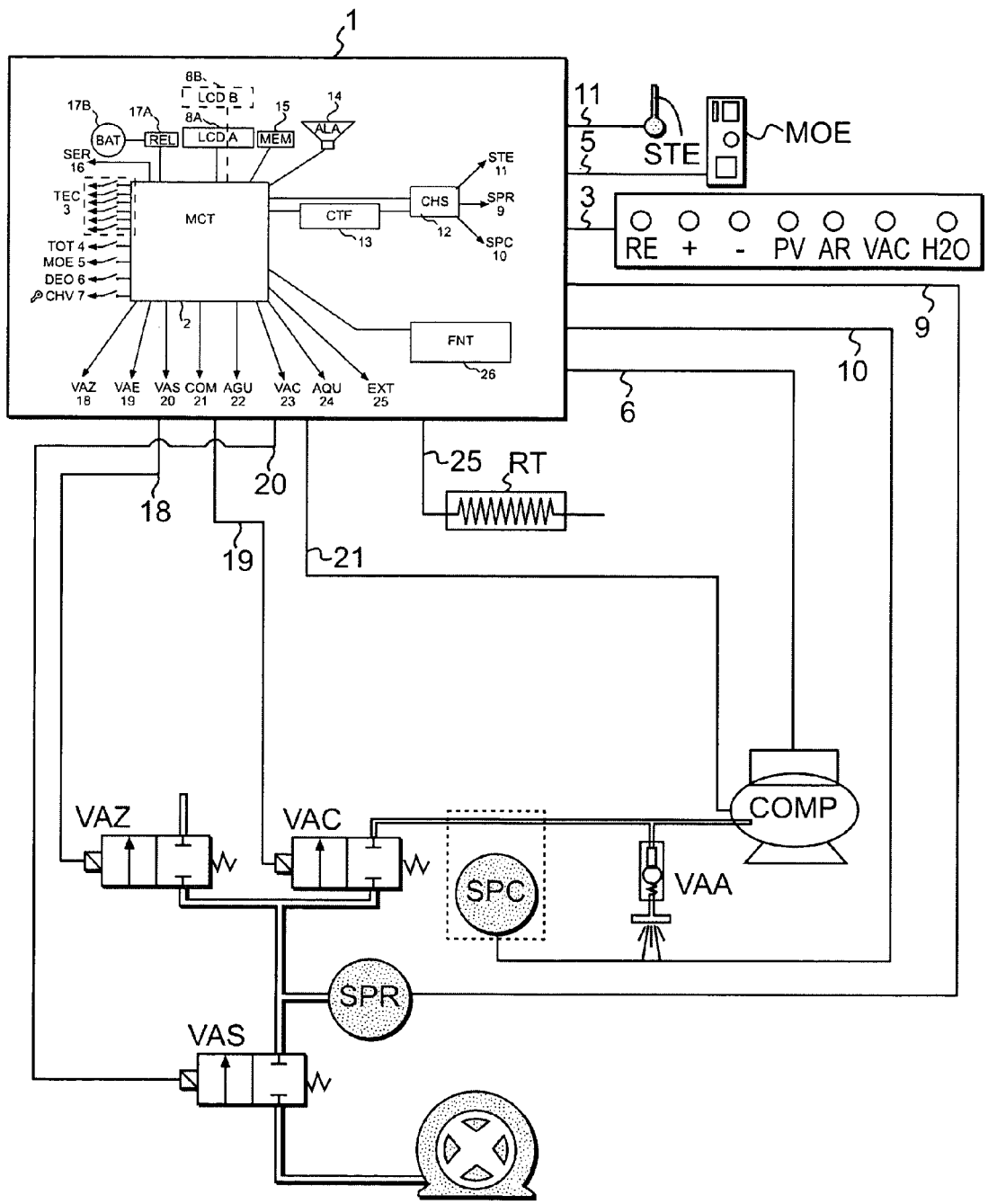
FIG. 5 illustrates the system operated by token or coin.

FIG. 5 shows details of the system operational scheme when operated by means of the insertion of tokens or coins. In this case the system uses the output MOE (5) of MCT (2) to receive the information from the coin box, as indicated on FIG. 5. The system only starts operating when a coin or token is inserted in the coin box. The alphanumeric display transmits the information of value, time, operation and etc., fundamental for the development of this system operated by coin. The insertion of the coins allows the system to offer varied services and resources such as air, vacuum cleaner, water, Shampoo, deodorizer, etc. As can be seen on FIG. 5, the power outputs, which already drive the solenoid valves and switches on the compressor, are also used for switching on the services of vacuum cleaner, water, etc. FIG. 9 illustrates the display of a system that offers only the air service, and FIG. 10 illustrates a system that offers air, water and vacuum cleaner. Such additional services are controlled by the MCT (2), which controls the usage time based on the clock (17) data and detection of coin insertion, done by output MOE (5).

Given the fact that this kind of equipment is normally set up in places exposed to the weather variations, the system heating resource is very important. In case excessively low external temperatures are detected and informed by the temperature sensor STE (11), the MCT (2) can switch on, through its power output (25), the thermal resistor RT conveniently placed in the box that contains the equipment, heating its interior and thus preventing the system stop due to freezing of the circuits (and specially the liquid crystal display (8)). Thus the system is clearly characterized as fully autonomous.

The description made up to this point allows the remark that in every model of the system of the present invention the hardware remains the same, regardless of the applications, varying only the modules connected to its outputs (vacuum cleaner, water, etc.). This approach converts what would be a mere tire calibrator into a vending machine.

The following description offers details of the system operation for tire calibration, which is different from the standards found in the state of the art.

Initially the compressor used on FIG. 5 eliminates the need for an air tank or reservoir, using only the head and the engine. The absence of the tank establishes the need for constant compressor operation. Instead of being a problem, that is actually an advantage, because it reduces the compressor cost, eliminating the need for compressed air storage, because the system switches on the compressor only when needed or when a service is requested. This conception sets some operational rules:

1—Before switching on the compressor the deflating valve (18) is opened, in order to de-pressurize the line. The SPC sensor (10) monitors said depressurization until the pressure falls below 10 PSI, when the compressor is switched on. This disposition affords the compressor startup with its outputs unloaded, requiring less effort from the engine, saving energy and minimizing the risk of compressor locking or engine circuit burning.

2—Once the compressor is switched on, the deflating valve (18) is closed and the line pressure is monitored through the do SPC sensor (10). The system checks if the line pressure value detected is sufficient for executing the requested tire calibration operation, establishing a minimum operation value, for example 60 PSI.

3—Once said minimum value of 60 PSI is reached, the system is liberated for initiating the tires calibration process, with the corresponding time countdown indicated by the alphanumeric display (8a). FIG. 10 indicates the routines indicated on the display.

As there is no buffer tank for compressed air, the non used excess air vents through the pressure regulation valve VAA controlled by a spring. In the example illustrated, the spring is adjusted for a maximum pressure of 70 PSI, and said pressure remains practically constant during the operation. Said spring controlled valve ensures that the line pressure is kept constant, serving also as a safety valve (pressure limiter).

The CHV (7) enables access to the gauging mode. As well as many other electro-mechanic machines, the compressor featured by the present invention relies on a good lubrication in order to operate correctly. Therefore it is important to monitor the lubricating oil level in the compressor. The sensor coupled to DEO (6) detects an occasional lack of oil in the compressor, sending the corresponding signal to the Microchip Controller MCT (2), which in turn commands the display of the message "Check Compressor Oil" and paralyzes the system (as a safety measure).

When the TOT (4) key is pressed, it sends a signal to MCT (2) to display the TOTALS, such as the quantity of coins inserted, the number of calibrated tires, the number of usage times for the vacuum cleaner, for water, etc. The coin TOTALS are of two kinds: one resetable, that can be reset by the user, and the other accumulative, that can never be reset.

Another innovation in the way the totals are presented is the entering of a password combined to the displayed totals, by means of a mathematic formula or any kind of combination, in order to verify whether values such as the number of coins, date of withdrawal and other data were correctly registered, because they must match a given password (see FIG. 12). As the formulas or combinations are secret, only the machine owner would have the decryption machine, so that it is possible to know (being away from the spot) if the collected number of coins corresponds to the expected number, because this number must coincide with a password. Depending on the type of encryption, it is possible not only to confirm the totals, but also determine these totals based on the encrypted data.

In the case of consigned equipment of which profit the owner of the premises receives a mere percentage, the encryption resource makes possible to leave the keys of the machine's safe with the supervisor or owner of the premises. Although the value to be paid is related to the quantity of coins collected in the machine's safe (which could suggest the idea of cheating on the part of the owner of the premises), the need to relay the data of coins total plus the password ensures a remote control of the income, rendering unnecessary any visits to the premises with the purpose of checking the total amount collected and thus the net income. Such collection control simplification makes possible the daily emptying of the machine's safe, reducing the risk of theft, with the consequent savings of fuel and time. Furthermore the owner of the premises will never feel cheated by the owner of the machine, because it is the owner of the premises who retrieves the collected coins from the machine and pays the percentage to the machine owner, keeping the rest.

Several different formulas can coexist in the same system. The password can feature one or two extra digits in the end, identifying the particular formula or combination used. FIG. 12 exemplifies a simple encryption using said resource. The use of said resource requires the register of both the date and hour of reading. The system can also be used the other way around, that is, once elapsed a certain period of time (or otherwise verified a given condition) the system interrupts its operation and stands by for the entering of a password to return to normal operation status. Said password must be issued by the equipment owner.

Serial Output (14) allows the connection of a small printer able to print a payment slip with the passwords and encrypted totals, as previously explained. This same output allows the connection of a modem to send and receive data through a telephone line. The Serial Output (14) allows also the checking of equipment usage conditions, operational failure report, etc., with no need for local visits, sufficing to make contact via modem and request a system report.

The system clock serves also to verify the time limit between consecutive gauging operations (FIG. 13). Once this previously scheduled interval is elapsed, the MCT (2) switches off the equipment, rendering it inoperative and displaying the message "PLEASE AFERIR" or "AFERIçAO ELAPSED". Upon the new gauging the MCT (2) calculates the new deadline date. Such resource allows the user to check if the equipment is in conditions of use before starting its operation.

FIG. 10 illustrates step by step the system operation when a coin is inserted and the user requests air for the tires.

FIG. 6 illustrates the fact that if the tire inflating valve is not switched on, the volume of pressurized air contained between the compressor and the valve (inside the hose) vents to the atmosphere.

It is well known that any gas, once compressed, increases its temperature. The system of the present invention compresses the air only when the tire inflating valve is switched on. This way the engine operates with little or no resistance for a longer period of time. The system's internal temperature falls considerably, increasing considerably its yield.

The minimum air pressure value necessary to initiate the compressor operation is no higher than 60 PSI. The line pressure depends on the valve output hole diameter and also on the compressor flow volume. However, if it is desired to effectively test the compressor's pressurization capacity, it is possible to open the VAC valve (19) and close the VAS safety valve (20), thus preventing the exit of the air to the atmosphere, raising the line pressure and causing the opening of the relief valve VAA, which prevents the buildup of excessive line pressures.

Switching on the Equipment by the Insertion of Coins

The system for charging for the services rendered using the collection of coins inserted by the user into a proper opening (MOE) set beside the keyboard (3) (FIG. 1) allows an individualized charging for each one of the services offered, based on usage time. The equipment can be delivered featuring the following program settings:

by inserting a 25 cent coin, the user can use for up to 3 minutes the water supply (for washing, for example).

by inserting two 25 cent coins, the user can use for up to 3 minutes the compressed air supply (to calibrate tires, execute general cleaning services, etc.).

by inserting three 25 cent coins, the user can use for up to 3 minutes the vacuum supply (for vacuum cleaning).

In order to initiate the use of any of these options, besides inserting the coins and selecting the option (water, air or vacuum), the user must also press the RESET key (start). During the use it is possible to buy more time inserting extra coins. The times or values charged can be altered through the modification of the system programming.

FIG. F2 illustrates a flowchart of the auto-reset test program and connection to a tire, liberating the stand-by mode.

FIG. F3 illustrates a flowchart of the program for detecting the air volume contained in the tire (test to check if the tire is empty).

FIG. F4 illustrates a flowchart of the pressure stabilization control program in the calibrator, hose and tire set.

FIG. F5 illustrates a flowchart of the program that sets the base time for subsequent calculation of the tire total inflating or deflating time.

FIG. F6 illustrates a flowchart of the program which controls the inflating or deflating of the tire (the calibration itself).

FIG. F7 illustrates a flowchart of a program that executes the checking of compressor and line, before initiating operations, commanded by coin detection.

FIG. F8 presents a diagram that signals on the alphanumeric display (8a) the use of other services such as water, vacuum cleaner, shampoo, air, etc.

FIG. F9 illustrates a flowchart of the program that commands the equipment, in the case where it features an air-retention tip.

FIG. F10 presents a diagram of the messages displayed, being said messages presented to the user when the tire to be calibrated presents large dimensions (for example a tractor tire).

FIG. F11 depicts a connection scheme of the MANUAL EMERGENCY circuit connections.

Once the several characteristics of the present invention's system are described, we now move on to describing the operation of the routines performed by the present invention's card. With the purpose of making it easier to understand, we will divide the description into operational phases:

I—AUTO-RESET TEST (auto-gauging)
    II—TIRE PRESSURE TEST (empty tire)
    III—LINE STABILIZATION CHECKING
    IV—MINIMAL PRESSURE PULSE CALCULATION
    V—CALCULATION OF THE TOTAL TIME REEQUIRED FOR INFLATING OR DEFLATING THE TIRE
    VI—SWITCHING THE EQUIPMENT ON BY INSERTING COINS
    VII—COMPRESSOR CHECK (in the switching on by inserting coins)
    VIII—WATER SUPPLY (in the switching on by inserting coins)
    IX—VACUUM SUPPLY (VACUUM CLEANNING)
    X—AIR SUPPLY (in the switching on by inserting coins)
    XI—AIR-RETENTION TIP EQUIPMENT
    XII—INFLATING TRACTOR TIRES
    XIII—AUTOMATIC EMERGENCY
    XIV—MANUAL EMERGENCY
    I—AUTO-RESET TEST OR AUTO-GAUGING Once the RESET key is pressed (FIGS. 2 a 6) the Microchip Controller MCT (2) receives this signal and instantly begins an auto-test to reset the equipment, define the base point, the lower limit, etc. in order to execute said auto-test, it is interesting to follow through FIG. F2 the description of flowchart (A). Once pressed the RESET-start key (step 100), the Microchip Controller MCT (2) reads the pressure value detected by SPR sensor (9) (FIGS. 2 to 6) and stores such data in memory MEM (15) as OFFSET1 (step 101) of flow (A) of FIG. F2. After that, the Microchip Controller MCT (2) commands the opening of the solenoid valve to deflate the tire VAS (20) to empty the hose (step 102). After some milliseconds, a new reading of pressure SPR sensor (9) is effected with the deflating valve opened, storing this data in variable OFFSET2—(step 103). OFFSET1 is compared with OFFSET2—(step 104). In case there is any pressure in the hose, this will be eliminated while the deflating valve is opened making the reading of OFFSET2 lower than OFFSET1. Therefore, if OFFSET1 is higher than OFFSET2, that is, if the value of the first pressure reading is higher than the value of the second pressure reading, then probably the hose tip of the equipment is wrongly connected to the tire. In this situation the Microchip Controller—MCT (2) displays the messages "DISCONECT TIRE" and "PRESS RESET AGAIN" (step 105), thus returning to the beginning of flowchart (A). It is worth observing that it is not possible to begin using the equipment with the tire connected to the system.

Once the hose is disconnected of the tire and therefore OFFSET1=OFFSET2, it is necessary to check if the OFFSET value is correct and if the sensor is in use conditions. Being OFFSET the zero value defined at the factory original calibration, in case OFFSET1 is now lower than (OFFSET+X), being X a tolerance value admitted by the equipment regarding the value of OFFSET (step 106), the flow will be directed to the new comparison. If OFFSET1 is higher than (OFFSET−X) (step 107), the MCT resets the MOUT counter (step 103). This last action will be properly described further below. The result of all this analysis is that the value of OFFSET1 (read in the sensor) is comprised between the values of OFFSET (original factory calibration zero) minus a certain tolerance value and the same OFFSET plus the same tolerance value. Therefore, the value of OFFSET 1 is now to be considered, for the sake of calibration, as being the equipment zero value therefore, the display now displays the messages "WELLCOME" and "TEST 0.000" (step 109). However, returning the analysis to steps 106 and 107, if the MCT detects that the value of OFFSET1 is below the value of (OFFSET−X) or above (OFFSET+X), and therefore out of the auto-reset limits, the MCT will instruct the equipment to display on alphanumeric display (8a) the message "AUTO ZERO ERROR" and will instruct the user to try the operation again with "PRESS RESET" (step 110). At this same instant the system generates a variable with the name MOUT, which will serve to limit the quantity of times the equipment will try to determine its auto-reset value. Normally the process is satisfactorily defined in no more than three tries. Thus, if there is no success after three attempts to set the equipment zero (steps 111 and 112), the equipment interrupts the service, displaying the messages "OUT OF SERVICE" and "AUTO ZERO ERROR" (step 113). It is worth noting that upon execution of steps 105, 110 and 113, besides the displaying of the messages the equipment also issues an audio Alarm.

The establishment of the auto-reset for each operational cycle of the equipment affords it a higher precision in the calculation of the times for inflating or deflating, because the auto-reset value is the base from which is initiated the whole required calculation process. Said configuration makes the system calculation operations of the present invention more precise and fast.

Once established the auto-reset value, the MCT (2) directs the flow to the checking of the tire pressure value. FIG. F3 and flow B illustrate such a checking.

II—INITIATING, CURRENT TIRE PRESSURE VALUE TEST

Right after the last message of flow (A) ("WELLCOME" and "TEST 0.00") and after some seconds have passed by, another message is displayed: "ENTER SELECTED PRESSURE" with the default or initial pressure of 26 PSI (step 150) of flow B illustrated on FIG. F3.

Then the user enters the selected pressure value for that tire, using the + or − keys of the keyboard (3) (FIGS. 2 to 6). It is worth noting that the system has an automatic startup, thus not requiring the pressing of the start or begin key. All it takes is a little air inside the tire, and once the hose is connected to the tire the system automatically starts to inflate, as shown on FIG. F3 by flowchart B.

Regardless of whether a selected pressure value is entered or not, the MCT (2) automatically starts the time countdown (step 151) of 90 seconds and then begins a cycle of reading repetition. The MCT (2) checks the pressure SPR sensor (step 152), and then checks to see whether any key was pressed (step 153) and, in the affirmative case, restarts the time countdown of 90 seconds, keeping up the display of the message "SELECTED PRESSURE" in the alphanumeric display (8a).

If no tire is connected to the hose or no key is pressed during the 90 seconds time (step 154), the message "SELECTED PRESSURE" disappears from the display and the system returns to stand by (FIG. A), waiting for the pressing of the RESET key to restart the operation.

At the instant in which is established the connection between the equipment and the tire, the pressure SPR sensor (9) of MCT reads the tire pressure value (step 152). Still at this same moment, the MCT (2) checks if the pressure value stored in the variable SPR (9) is lower than VMP (Minimal tire pressure value), in order to judge if the system can operate (step 155). If SPR (9) is lower than VMP, the MCT (2) goes back to reading the SPR sensor (step 152) and all the further subsequent routines.

For safety reasons, the automatic start of the system occurs only if the pressure is higher than 5 PSI (VMP=5), although the system detects on connection pressures of up to 0.05 psi. The situation in which the tire pressure tire is too low or even zero is interpreted by the system in much the same way as when the hose is disconnected: The user must then press the "EMPTY TIRE" key, proceeding to flowchart PV.

Once the user has pressed the PV key (step 160), the system begins the pulse counting (step 161), in order to open the tire inflating valve, subtracting one unit from the counter (step 163). Then the system compares the value with ZERO (step 164), which establishes if all the repetitions were concluded. After that the system checks if the pressure read is lower that the minimum pressure value in order to begin (step 165) and opens the tire inflating valve for a certain period of time, for example 1 second (step 166), in order to increase the tire pressure.

If after the N pulses (in the illustrated example there are 5), the pressure remains below 5 PSI, the display (8a) displays the message "NO TIRE" and the system returns to routine B. after 90 seconds have elapsed without any usage or any pressed key, the system enters the stand by mode (FIG. A).

Here it is important to observe the advantage of the present invention system, because the sensitivity of the electro-pneumatic calibrator allows it to detect minimal values of air pressure inside the tire, different from what happens with the equipment currently found in the state of the art. The VMP value can be up to 1 PSI, or even lower. Therefore the "EMPTY TIRE" key is very rarely used, and then that happens typically in the case of brand new tires (inflated for the first time ever) or in tire repair shops (just mended tires). Even in such cases, if there is any pressure inside the tire (even a very low pressure), there will be no need to press the "EMPTY TIRE" key, given the remarkable sensitivity and precision of the present invention electro-pneumatic calibrator.

Once the AUTO-RESET value is established by the equipment, the hose is connected to the tire and the quantity of air inside the tire is detected, the system starts to pursue pressure stabilization in the equipment-tire set said stabilization is necessary because only now, based on the auto-reset value, plus the equipment factory set parameters is the calibrator able to effect the correct, real and precise calculation of the required time for inflating or deflating the tire.

The routine checking flow of line stabilization is illustrated on FIG. F4 (flow C).

III—LINE STABILIZATION CHECKING (2 Modes)

Mode #1:

After detecting the minimum air volume in the tire required for starting the calibration process, the system reads the value on SPR sensor (9) and stores said value in SP1 (step 200) (FIG. F4) (flow C). The system waits some milliseconds (already defined by the equipment) (step 201) and then effects a new reading of the SPR sensor (9) (step 202), storing the newly read value in variable SP2.

The system then calculates the difference between the values of SP1 and SP2, and checks if the modulus of the result is lower than VE (stabilization variable) (step 203) being this the minimum value admitted for variation of the line pressure (equipment-tire) in order to consider said line stabilized. The VE stabilization variable also contemplates the desired precision level, so that it is possible to define VE (indicated in PSI, or pounds per square inch) with one, two, three or more decimal digits (precision of tenths, hundredths, thousandths, etc.). It is worth observing that, for the system, the indication of pressure values in PSI is merely formal. Internally the system develops its own measurement unit, later converted into PSI for display. For example, in order to avoid the use of long numerical fractions, the system treats 1 point as the equivalent to 1000 points, therefore 0,5 pounds per square inch equals 500 points, 0,238 pounds per square inch equals 238 points, and so on. These points are converted by the specific routines into pounds per square inch, Bar, mmHg, etc. this aspect fosters the processing performance of the system operation algorithm.

If the difference between the pressures SP1 and SP2 is higher than VE, the MCT (2) activates a time register T0 (step 204) and returns the processing flow to its beginning (step 200). Being the difference between SP1 and SP2 lower or equal to VE, the processing flow goes on to step 205, where the system once more waits for T milliseconds. Once this short time interval is elapsed, the system reads once more the SPR sensor (9) (step 206) and stores the read pressure value in variable SP3. After that the MCT (2) calculates the difference between SP1 (pressure of the first reading) and SP3 (pressure of the third reading) and compares this value with the value of VE (step 207). If this difference is higher than VE (stabilization variable), the processing flow is redirected to its beginning, passing by the counter (step 204). Therefore one can conclude that every time there is a pressure difference in SPR (9) (taken in two distinct readings) and this difference is higher than VE (minimum value to consider the line stabilized), the MCT (2) will direct the processing flow to its beginning. It is important stress that said situation will only occur in case of problems in the line. In case of problems in the line, the pressure would never be considered stabilized and the processing flow would begin an endless repetitive cycle. In order to curb such hypothesis, the system processing flow is aided by the time countdown registered in T0 (step 204). After having registered the previously determined value of time To during which the cycle has been executed, the MCT (2) switches on the audio Alarm (ALA) and shows on the alphanumeric display (8a) the error message "NON STABILIZED PRESSURE". On the other hand, if the difference between SP1 and SP3 is equal or lower than VE (step 207), the MCT (2) will compare the last value read on SPR (9) (in this case stored in SP3) to VMP (Minimum pressure value) (step 208), following the sequence as indicated and with PD (selected pressure value, the one that was entered by the user at the beginning of the operational cycle) (step 210). If the value of SP3 is equal to the value of PD, the tire pressure will be exactly equal to the selected value, rendering unnecessary to inflate or deflate the tire (that means calibrated tire). Therefore the processing flow continues on (E), sounding the Alarm (ALA) and indicating on the alphanumeric display (8a) the messages "CALIBRATION END" or "TIRE READY" and "PRESSURE TIRE=SELECTED PRESSURE". If any difference remains between the value of SP3 and the selected pressure value, the processing flow continues on (D) to determine the base time required for calculating the tire total inflating or deflating time.

Once the line (equipment-tire) is stabilized and there is a pressure difference between the tire pressure and the selected pressure (selected by the user by means of pressing the corresponding keys), the equipment must determine for how long it must keep open the inflating valve (or the deflating valve) with the purpose of eliminating such difference, equalizing the tire pressure value and the selected pressure.

Mode #2:

Another form of checking the stabilization of the air contained in the hose and tire of FIG. F4A amounts to reading the SP1 value (step 210). The system waits for some milliseconds (T ms) previously set by the software (step 211) and executes a new reading by the SPR sensor (9) (step 212) on SP2.

SP1 is subtracted from SP2, the result is taken in its absolute value and divided by T ms (step 213). The resulting value is denominated air stabilization velocity VES, measured in bits/sec. It is worth noting that the sensor effects the calculations in bits, and only then converts the result into PSI.

After that (step 214) the system compares the calculated stabilization velocity VES to a new variable denominated predefined stabilization velocity VESP (step 215). Said new predefined variable is the minimum recommended variation to allow the assumption that the air is immobile inside the hose, enabling the use of said pressure value. In case of detection of an air volume with no movement (because there is no pressure variation) the processing executes step 218, in which it compares the last pressure reading (SP2) to the selected pressure (PD). After that, the processing routine continues as before.

IV—MINIMAL PRESSURE PULSE CALCULATION TO CALCULATE THE TOTAL TIME

The system generates a first test pulse. In case the pressure increase is not reliable, the system generates a second and finally a third pulse, until the issue of an error message or else the system starts processing the next step. In the example at hand, the system offers a high level of resolution, enabling the consideration of a minimum pressure increase in the order of 0.2 PSI.

These test pulses generally vary between 100 milliseconds and 2 seconds when the system calibrates large sized tires (such as tractor tires). The pulses are factory predefined, allowing their adjustment in the calibration routines in case it becomes necessary.

On FIG. F5 the MCT (2) creates variable VA and assigns it an initial value of zero. This variable purpose is to inform the MCT (2), during the calibration operation, if the routine to be described below has ever been executed or not. It is previously established that VA=0 indicates the need for executing said routine, and VA=1 indicates that it is no longer necessary to execute this routine.

This way, in case of VA=0 (step 300), the MCT (2) reads the value detected by the SPR sensor, equaling its value to the value of SP (step 301). The system generates a small test pulse, opening the tire inflating valve during T1 milliseconds (step 302). After that, the system reads once again the value of SPR, making its value equal to the value of SP2 (step 303). The pressure increase between the pulses is established subtracting SP from SP2, and the difference is stored in DSP (pressure difference between the first and the second sensor readings) (step 304). The system then checks if the value of pressure difference DSP is lower than the value of Vm (minimum reliable value to qualify this test pulse as acceptable). In reality this Vm value (minimum reliable value) is a parameter originally set at the factory. Its purpose is to serve as calibration reference. Once a given time interval elapses with the tire inflating valve opened, the line pressure variation must be higher than this reference parameter Vm. Failure of that characterizes the event of some problem in the line. Said parameter, set upon the equipment assembly, takes into consideration the time required for the pressure to vary and also the kind of tire being calibrated (bicycle, truck, automobile, etc). Back to the analysis of the processing flow at step 305 and being DSP lower than Vm, the MCT (2) executes a new try to establish the calculation base time, opening the inflating valve during another T2 milliseconds (with T2>T1) (step 306). The system reads the value of the SPR sensor (9) and stores the read value on variable SP2 (step 307), subtracts SP from SP2 and stores the result on DSP (step 308). After that the system compares again the values of DSP and Vm (step 309). If DSP is still lower than Vm, the system still cannot consider as reliable the opening time of inflating valve T2, moving on then to a third and last try to establish a reliable operation time. The system then opens the solenoid inflating valve during T3 milliseconds (being T3>T2>T1) (step 310), reads the SPR sensor, stores the value of said reading on SP2 (step 311), subtracts SP from SP2 and stores the result on DSP (step 312).

Then the system compares DSP with Vm (step 313). If DSP is still lower than Vm, the system indicates on the display (8a) the message "IMPOSSIBLE TO CALCULATE THE TIME", sounds the Alarm (ALA) and interrupts the operation (gets out of service).

However, if in any one of steps 305, 309 or 313 the value established for DSP is equal or higher than Vm, the MCT (2) will arbitrate a time value equal to TPEN (Base Time for calculation of the total tire inflating or deflating time). These events are represented on steps 315, 316 and 317, respectively.

This routine can be used for the detection of the size of the tire to be inflated, because the bigger the tire, the bigger the quantity of air and the bigger must be the air pulse in order to reach a given pressure variation VM. Furthermore, in case there is no air in the line (for example), DSP will always be equal to zero. In case of an inadequate connection between the hose and the tire or even in case of a leak, the air would escape, causing the system to issue an error message.

V—CALCULATION OF THE TOTAL TIME REEQUIRED FOR INFLATING OR DEFLATING THE TIRE

Once the test or initial pulse value is established, and also the value of the base time for calculation of the total inflating or deflating time TPEN, the MCT (2) initiates the calculation routine for the total time (FIG. F6) (flow E). This way the MCT (2) checks the value of variable VA (step 350), effects the calculation routine for the base time (flow D), applying then the mathematical formulas (step 351) in which the current pressure value (SP2) of the tire is subtracted from the previous pressure value (SP) before the test pulse, once more yielding the DSP value. In the calculation of the pressure time constant (K) the pressure difference (DSP) is divided by the estimated inflating time (TPEN), and in the first time the calculation uses the test pulse of routine F5.

Still on step 351, the new inflating time value will be: TPEN-(PD-SP2)/K, being PD the selected pressure.

The new general result of these mathematical operations (step 351), denominated TPEN (Total Inflating Time) corresponds to the amount of time required for inflating or deflating the tire until reaching the selected pressure (PD)

After that, the MCT (2) checks if the TPEN value is higher than the Tpmax value (Maximum time allowed by the equipment to open the tire inflating or deflating valve, in each step). Said checking is executed as a security precaution, forcing the equipment to fill or empty the tires step by step, regardless of the caution and precision used in the corresponding calculation.

For the sake of example, let us suppose that said calculation results in 11 seconds of introduction of compressed air in the tire (TPEN). Let us also suppose that TPMax as set for this equipment is 4 seconds. In the example under analysis, the inflating valve will be opened for only 4 seconds, instead of 11 seconds. The cycle is repeated until the 11 seconds of the calculated total calibration time are completed.

then, and only if TPEN is in fact higher than TPMax (step 352), the system assigns TPEN the value of TPMax (step 353) and continues the processing flow, opening the valve to inflate or deflate (step 354) during TPEN milliseconds. Now, in order to proceed to the next reading, the system stores the current reading as the previous one SP=SP2 (step 355) and reads once again the value of the SPR sensor (9), storing this value on SP2 (step 356). Then the system checks if SP2 is lower than (SP+V), being SP the former pressure of the tire and (V) a parameter characteristic of the equipment (factory set) in the order of 0.5 PSI. If SP2 is lower than (SP+V) (step 357) and TPEN is Maximum, equal to TPMAX, it is clearly established that there has been little pressure variation for such a long pulse, which is incompatible, because long pulses generate long pressure variations. The alphanumeric display (8*a*) then exhibits the messages "LITTLE VARIATION" and "PRESS RESET" in order to indicate the necessity of restating the process.

However, if SP2 is higher or equal to (SP+V) (step 357), the processing flow goes on, checking if SP2 is lower than SP (step 359). In case it is, it is established that the variation was undue (step 360) and/or that there may have been some problem in the line. In case of introduction of air the pressure cannot decrease, and therefore SP2 cannot be lower than SP, therefore MCT exhibits in the alphanumeric display (8*a*) the messages "UNDUE VARIATION" and "PRESS RESET" to suggest a new try.

After that the MCT (2) compares SP2 to PD (Desired pressure) (step 361). If SP2 is equal to PD, the tire will be calibrated and the display (8*a*) will yield the messages "CALIBRATED TIRE" (step 362) and "initial tire pressure value=PD". If SP2 is higher than PD, the processing flow proceeds to the deflating routine (step 364).

However, if SP2 is lower than PD, but higher than SP, the cycle returns to the beginning (step 351), recalculating the new opening time for the tire inflating valve, and then on until the final calibration of the tire.

VI—SWITCHING ON (AND CHECKING) THE EQUIPMENT BY INSERTING COINS

Upon detection of the insertion of one or more coins and once pressed the RESET key (start), the MCT commands the opening of the solenoid valve to deflate the tire VAZ (17) (step 400) (FIG. F7) (flow F).

Said deflating, necessary in order to allow the switching on of the compressor without line pressure, allows the startup of the compressor without downstream loading. After that, the MCT (2) reads the value of the compressor pressure sensor SPC (13) (step 401) and initiates the maximum and sufficient time counting to deflate the line (step 402). In case the line continues pressurized by the time T1>5, the MCT (2) interrupts the operation and displays the message "Out of service", leaving the compressor off.

If T1 remains<5, the MCT (2) compares the read value to (Z), which is the maximum allowed pressure value for the compressor startup (step 403), assumed to be up to 10 PSI.

If the pressure SPC read is lower than Z, the Microchip Controller MCT (2) (step 403) commands the closing of the deflating valve VAZ (17) (step 404) and resets the time counting, switching on the compressor (22) (step 405) and opening the tire inflating valve. The system now effects a new reading of the pressure at the pressure sensor (13) of compressor (22) (step 406), and during a time interval T1 shorter than 5 seconds (step 407) compares once again this read pressure value to (Z) (minimum value of required compressor internal pressure to inflate the tire with safety) (step 408). If now the value of this pressure (read on SPC) is higher than Z, the MCT (2) orients the processing flow to I (FIG. F8), hat is, continues the service that has just been selected by the user. Let us now examine the possibility of (step 402 and 403) the comparison indicating that SPC (pressure reading upon opening of the deflating valve) is still higher than Z (minimum value of compressor pressure). In this case, the MCT (2) concludes that there is a problem in the line or in the compressor, suspending the operation immediately and showing the message "OUT OF SERVICE" on the display (step 409). A similar situation occurs on steps 407 and 408, where the SPC reading may indicate a value lower than (Z), even with the deflating valve closed and the compressor on. The MCT (2) suspends the operation immediately, indicating on the display the message "OUT OF SERVICE" (step 410), because the compressor does not have enough pressure to inflate the tire, due to some problem in the compressor or in the line.

VII—WATER SUPPLY (switched on by coin insertion)

Assuming that the user has selected the purchase of water, the MCT (2) orients the processing flow to G (FIG. F8), where the water pump is switched on (step 450) and is initiated the countdown of the time selected and paid (step 451). Elapsed this time, the system switches off the water pump (step 452) and indicates on the display the messages "THANK YOU" and "WATER SWITCHED OFF" (step 453).

VIII—VACUUM SUPPLY(VACUUM CLEANNING)

Let us assume now that the user has selected the services of the vacuum cleaner, in order to effect the cleaning of his vehicle. In this case, the MCT (2) is oriented as indicated by flow H (FIG. F8), equal to flow G of the same FIG. F8, altering only the steps 450 and 452 where, instead of a water pump, a vacuum pump (vacuum cleaning) is switched on. All the remaining steps are analogous. Finally, elapsed the time bought, the display indicates the message "END OF VACUUM".

IX—AIR SUPPLY (switched on by coin insertion)

In this case, the equipment follows rigorously all the routines already described regarding the inflating or deflating of tires, starting with the AUTO-RESET TEST (FIG. F2) (flow A).

X—AIR-RETENTION TIP EQUIPMENT

Upon acquiring the electro-pneumatic calibrator equipped with the present invention's card, the client may choose a model that eliminates the "EMPTY TIRE" key, working instead with a pressurized hose. In its place the MCT (2) will enable a routine denominated "air-retention inflator routine". Inflator is the term used to mean the tip that contacts the tire, being the air-retention tip typical in the market. This model only allows the displacement of the air inside the hose upon detecting the connection of the hose to a tire. Otherwise, the air is retained inside the hose and the air-retention inflator routine monitors the air inside the hose itself, not allowing it to escape to the atmosphere therefore, if the tire is completely empty and is connected to the tip or inflator, the internal pressure on the hose will drop, causing the MCT (2) to activate the equipment.

Upon pressing of the RESET key the MCT (2) opens the tire inflating valve VAE for a brief period, which is however sufficient to pressurize the hose, because the inflator features the retention tip that does not allow the air to escape to the atmosphere. It is worth noting that the volume of air contained in the hose is very small, specially if compared to the internal volume of a typical tire. Thus, as small as the pulse might be, the hose is quickly filled up with high pressures, which reach the air line or the compressor. Therefore it is not good to use low quality hoses. Once pressurized, the only way to empty a hose is to connect it to a tire, which would entail the transference of said air volume to the inside of the tire. The only option would be the opening of the deflating valve.

In normal operation, the system detects the presence of air inside the hose and automatically commands an inflating or deflating maneuver, depending upon the selected pressure. As the hose is pressurized, there is a problem of characterizing the situation in which the inflator is not connected to the tire. Said problem is solved by arbitrating a minimal reference pressure that allows the establishment of whether a hose is connected or not. In other words, supposing that the minimum reference pressure is 100 PSI, therefore below 100 PSI, the inflator will be connected to the tire. Above 100 PSI the inflator will be disconnected from the tire and the system must stop operating, operating only with pressures below 100 PSI. this value of 100 PSI is only illustrative, for it varies according to the selected pressure.

This way, upon connection of the hose to the tire, the pressure would drop and the MCT would command the cycle to inflate or deflate de tire, depending on the selected pressure. Once the process is over, the Alarm (ALA) would sound, and after a given period of time the MCT (2) would activate the tire inflating valve with a small pulse, in order to pressurize the hose for the next tire to be calibrated, waiting for a pressure lower than the reference pressure to restart the process.

If the user forgets to disconnect the hose from the tire, this final pressurization pulse will be absorbed by the tire, and therefore the pressure would be lower than the reference pressure, causing the system to restart the calibration, and so on until the disconnection of the inflator.

In some cases the compressor may not reach the minimum pressure required to pressurize the hose. Supposing the current example (reference pressure 100 PSI) with a pressure of 80 in the compressor, it would never be possible to pressurize the hose in order to establish if it is connected to the tire or not. The solution adopted for this problem was to transform the reference value into a floating variable according to the selected pressure, adding an X value to the selected pressure and considering this one as the reference value.

This way, if X is 20 and the selected pressure 26 PSI, the reference pressure value is 46 (26+20)PSI. In this case if the pressure inside the hose is higher than 46 the hose is disconnected from the tire. This routine for the retention tip is shown in the scheme of FIG. F9 (flowchart J). it is a simple routine which is repeated every time the MCT (2) reads the SPR pressure sensor. Therefore the MCT (2) is always checking if the hose is connected to tire or not.

After the reading of the SPR pressure sensor (9)(step 500) the MCT (2) proceeds to comparing this value (SP) to the selected pressure value plus X, being X the increase which is added to the selected pressure value (step 501), just like in the previous example, but which can be any other value according to the circumstances. If the SP pressure is higher than (PD+X), the MCT (2) returns the pressure sensor reading value until this is lower than (PD+X).

When SP is lower than (PD+X), the MCT (2) compares the SP value with PD (step 502). If the values are different, it is concluded that the operation is not yet finished and the system returns to the steps before this routine, inflating or deflating the tire. If the values are equal, the tire will be ready and the processing continues until step 503, sounding the BIP for 5 seconds in order to inform the user that the system will once more pressurize the hose, allowing the necessary time interval to execute the disconnection. Step 504 allows the hose pressurization for the calibration of the next tire.

It is worth remembering that the EMPTY TIRE key is no longer necessary, as well as walking back to the keyboard to press it. The option for the retention tip or inflator is convenient for tire assembly shops such as those found on tire repair shops or new tire stores.

In the previous cases, when the tire is completely empty and the hose is not pressurized, it is necessary to press the "EMPTY TIRE" key, which generates a signal to cause the MCT (2) to open the tire inflating valve for some seconds, with periodical sensor readings, in order to detect the presence of some pressure in the hose, which would eventually initiate the calibration process.

XI—INFLATING TRACTOR TIRES

In order to inflate the tires of tractors or earth-moving machines (specially when these have just been mounted and are completely empty) it is fundamental that the tire receives an overpressure higher than the selected pressure, so that the tires talon touches the wheel. In the example illustrated by FIG. F10 said pressure is from 35 to 40 PSI, a value recommended for tractor tires. Once this pressure is detected, which is identifiable in the alphanumeric display (8a) (step 550) (FIG. F10), the equipment executes all the initial routines. Under normal conditions, the system will open the solenoid inflating valve until it reaches the entered overpressure value (in this case 40 PSI) (steps 551 and 552). That causes what those skilled in the art call "closing the tires talon on the wheel", which corresponds to secure a perfect laying of the tire, preventing pressure losses by means of eliminating the spaces between the tire (rubber) and the wheel (metal). Once the overpressure value is reached, the MCT (2) commands the solenoid valve to deflate and executes the routine E (FIG. F6), until the selected tire pressure is reached (steps 553 and 554).

XII—AUTOMATIC EMERGENCY

During the process of inflating/deflating the tire, the equipment counts on a parallel routine that works along with any of the equipments operational routines, commanded and monitored by the MCT (2), which detects any abnormality on the pressure line (compressor-hoses-tire), any typing errors and even failures of some equipment internal component upon performing its function. When any of these abnormalities is detected, the MCT immediately turns off the equipment, activates the Alarm, opens the deflating valve, exhibits on the display the message "EMERGENCY" and interrupts the operation (gets out of service).

The error routines, some of them already described, are listed below:

1—there are 4 basic hypothesis for, once the tire inflating valve is opened, the pressure does not raise: the tire inflating valve may not be opening, the pressure sensor that reads the hose pressure may be malfunctioning, there is no line pressure (compressor turned off or insufficient line pressure) or there is an air leak in the connection between the hose and the tire. Regardless of what might have been the specific cause, the system exhibits on the display the Error message "No pressure", which means there is no pressure change.

2—there are three hypothesis to justify that after the calculation and opening of the tire inflating valve with maximum time, the pressure variation is lower than 1 PSI: that the line pressure is low or on the limit, that there is an obstruction of the line causing a decrease in the flow or that there is an air leak in the hose that connects to the tire. The system exhibits the Error message "No pressure 2".

3—the system executes the pressure reading of the sensor (SPR) during the inflating, or while the tire inflating valve is opened, and compares the value with the one obtained with the valve closed. In this case, if the two pressures are equal (or until the first lower reading occurs), the system indicates that the line pressure is low or the compressor is turned off, because under correct operation conditions the reading with the tire inflating valve opened is necessarily higher than the reading with the inflating valve closed, otherwise there would be no movement of air and there would be no inflating of the tire. The system exhibits the message "Check Tank". It is worth observing that this condition is indispensable for the basic version, which does not use the second pressure sensor that measures the compressor pressure.

4—upon connection of the hose, if after the 3 initial test pulses there is no variation of pressure (either inflating or deflating), the system exhibits the Error message "No Variation".

5—as previously described, the pressing of the RESET key commands the reading of the pressure sensor with the purpose of capturing or confirming the ZERO value. In case this one does not match the value factory registered in the memory, the system exhibits the message "AUTO ZERO ERROR". Just like described for the previous routine of FIG. F2 the system may exhibit the message "Disconnect Tire".

6—if during the inflating or deflating any key is pressed, the system automatically interrupts its operation and the deflating valve is activated for as long period, because the system assumes it to be an emergency situation. The Alarm (ALA) sounds continuously and the Message "Emergency" is shown on the display (8a).

7—if during the operation de inflating the pressure value exceeds in more than 5 PSI the selected pressure, the system stops automatically and the deflating valve is activated for a long period. The Alarm (ALA) sounds continuously and the Message "Emergency 2" shows up on the Display.

8—If the compressor pressure exceeds the value of the maximum allowed pressure (Reading of the SPC Sensor) the system stops automatically and the deflating valve is activated for an undetermined period. The Alarm (ALA) sounds continuously and the Message "Tank in Danger" shows up on the Display.

XIII—MANUAL EMERGENCY

In addition to the AUTOMATIC EMERGENCY circuit, the equipment also features the EME key, to be pressed by the user or any other person, to ensure the equipment operational safety. The same procedure may also be executed, as seen before, by pressing any key during the use.

The activation of the MANUAL EMERGENCY function is associated to some internal dispositions. The EME key of the computer card for electro-pneumatic calibrators with system management of the present invention (FIG. F11) itself was installed in the equipment, and a relay (24) was installed in the neutral phase of the electric power source, while the line of the power source was connected directly to the equipment (1). It is noteworthy also the disposition of a direct connection between one of the relay borne (24) and the solenoid deflating valve (17) (FIG. F11). Under normal operation conditions, the equipment is supplied all the power required for performing its functions. If for any reason the EME key (emergency) is activated, the relay interrupts the neutral phase, thus interrupting immediately the power supply to the electro-pneumatic calibrator. In said situation the system activates the Alarm (ALA), exhibits on the display the message "EMERGENCY" and interrupts its operation (gets out of service).

simultaneously, the relay (24) connects the power supply line to the solenoid deflating valve (17), which proceeds to the total deflating of hoses and tire.

The present invention offers several advantages when compared to the current state of the art, featuring some conceptual differences that afford it both constructive and operational advantages, some of which are listed below:

1) the system is sufficiently sensitive as to detect minimal air pressure values in the tire, contrary to what occurs with the current state of the art equipment;

2) the system features an alphanumeric display or screen, with two or more information lines;

3) The information presented on said display is frequently updated, contemplating situations detected before, during and after the use of the equipment;

4) being the equipment in the inflating mode, the display exhibits the message "INFLATING . . . " for the sake of user orientation;

5) Being the equipment in the deflating mode, the display exhibits the message "DEFLATING . . . " for the sake of user orientation;

6) the display also exhibits additional information such as: "EMERGENCY", "AUTO TEST", "AUTO TEST OK", "ERROR Nr", "WAIT", "DESIRED PRESSURE EQUAL TO TIRE PRESSURE", "REMAINING TIME FOR FINISHING THE OPERATION", "END", ETC.;

7) before the starting of each operation, the display exhibits the local DATE, HOUR and TEMPERATURE;

8) the display may optionally be programmed so as to exhibit advertisement;

9) any operation executed by the equipment user that is incompatible with the processing being currently executed will block its operation, causing the exhibition of a message on the display and the immediate opening of the deflating valve;

10) the mistaken or inopportune activation of a key also blocks the equipment, causing the exhibition of a message on the display and the opening of the deflating valve; if the equipment enters the emergency mode, the equipment initiates immediately the process of deflating the tire, regardless of the current operation mode;

11) the display also indicates if the tire is or not correctly connected to the equipment;

12) the standards and minimum and maximum limits of operational pressure are previously defined for each installation site (transport company, tire repair shop, bicycle shop, airport, auto service station, etc.) according to the kind of the most frequently expected vehicle;

13) said standards or limits may be changed whenever necessary, by means of the introduction of data through the keyboard, without incurring in any additional cost;

14) in order to change said values, the equipment demands the entering of a user password, which enhances security;

15) before initiating any new operation, the equipment executes a self-test, checking the status of the source of compressed air and the pressure sensors, plus the possibility of leaks in the line, connection or disconnection of the tire;

16) the system also effects the checking of the service life of the pressure sensors, in order to facilitate the preventive maintenance control;

17) The equipment features a mechanical key for controlling access to allow/disallow its operation, being also possible to activate it by inserting coins;

18) in the case of activation by means of coin insertion, the user may acquire supply services for:
compressed air (to calibrate tires, for example);
vacuum (for vacuum cleaning, for example);
water (for minor cleaning, for example)
detergent (also for cleaning, for example)
nitrogen (for inflating tires, for example)

19) still in the case of activation through the insertion of coins, the equipment incorporates internal counters and totalizers, to offer a balance of its operation and turnover;

20) the clock introduced on the display also controls the preventive maintenance work periodicity and the changing of spare parts and/or components;

21) the display may optionally be of a double-faced kind (front and back) to offer a better view to the user; indicating also the current pressure, the equipment keeps the selected pressure for calibration since the starting of the operation (inflating/deflating), until the effective disconnection between the hose tip and the tire;

22) The equipment, by means of a temperature sensor, turns on and off an internal heater, every time the temperature reaches previously programmed values, for protecting the operation of the equipment and specially of the display (made of liquid crystal),; thus avoiding its freezing.

23) The equipment uses a voltage/frequency converter which is much more effective and presents a lower cost than the AD converters used on many equipment of the state of the art; offering also a much higher degree of resolution, essential for its operation. The same converter ensures the system ability to detect minimal pressure variations.

24) the system keyboard (3) is very simple, featuring only four or five keys; incorporating also a serial port for remote communication and monitoring.

25) The equipment features an escape valve, set between the compressor and the inflating valve, to allow continual operation of the compressor, without heating, under constant pressure and without internal variation;

26) The equipment features a safety valve, operating in synchronicity with the inflating valve. Even with the inflating valve opened, the safety valve is kept closed, preventing the air to move from to the tire and opening only if the internal pressure of the line (compressor-hose-tire) is below the previously set parameters;

27) The equipment features a special tip for connection to the tire which eliminates the preliminary inflating phase, for automatic activation, when the tire is completely empty;

28) The equipment allows the designation of an overpressure value to facilitate the inflating of large-sized tires, such as for example tractor tires, to ensure that the tire "closes" totally on the wheel ("closing talon");

29) the equipment incorporates a specific and special key (EMERGENCY) to be pressed in any abnormal situation detected by the user. This key turns off the calibrator, activates an alarm and empties immediately the pressurized line and the tire.

Those skilled in the art will realize that the previous description of the preferred embodiments does not limit the application of the present invention to systems with those features described. The present invention can be adapted to similar systems without departing from the scope and inventive spirit covered by the following claims.

What is claimed is:

1. A computer card for controlling electro-pneumatic calibrators of a system including a tire pressure sensor, a compressor pressure sensor for sensing the pressure of a system compressor, a temperature sensor, a water inlet control, a vacuum cleaner control, an electric heater control, an alarm, a modem providing input information and output information, solenoid valves for controlling inflation of a tire with air, inflation of a tire with nitrogen, and deflation of a tire, solenoid valves for the system compressor, and a purge valve, said computer card being adapted to be connected to a power source and a relay, and including, in a front part thereof, a liquid crystal display and a data input keyboard for entering data into the computer card, said computer card further comprising a microchip controller for storing system management programs and for receiving input information from said data input keyboard and from said tire pressure sensor, said compressor pressure sensor, said temperature sensor, said modem, and a mechanical enabling key, and for, based on said input information, controlling operation of said solenoid valves for controlling inflation of a tire with air, inflation of a tire with nitrogen, and deflation of a tire, said solenoid valves for the system compressor, said water inlet control, said vacuum cleaner control, said heater control, the output information of said modem, said alarm, and said liquid crystal display.

2. A computer card as claimed in claim 1, wherein the liquid crystal display comprises a front display, and wherein the system further comprises a rear liquid crystal display.

3. A computer card as claimed in claim 2, wherein the microchip controller transmits information to the front display and to the rear display, before, during and after the calibration operation, to provide displaying of previously defined messages.

4. A computer card as claimed in claim 2, wherein the microchip controller receives temperature data from the temperature sensor and provides for display of said temperature data on said front display and said rear display.

5. A computer card as claimed in claim 2, wherein the microchip controller commands the activation of a heater, as needed, for protection of the front display and rear display against the damaging effects of low temperatures.

6. A computer card as claimed in claim 2, wherein the microchip controller receives data from a clock and provides information with respect to preventive maintenance and replacement of spare parts on the front display and the rear display.

7. A computer card as claimed in claim 2, wherein the microchip controller is connected to a sensor for detecting a parameter relating to the operation of the compressor and, if necessary, immediately interrupts compressor operation, and provides a corresponding message on the front system display and the rear display.

8. A computer card as claimed in claim 7 wherein said parameter is compressor oil level.

9. A computer card as claimed in claim 2, wherein the microchip controller, upon entering an emergency mode, instantly opens a solenoid valve for controlling deflation of a tire, interrupts at least one action by the system, provides for display of a corresponding message on the front display and the rear display, and activates the alarm.

10. A computer card as claimed in claim 1, wherein the microchip controller checks on current tire pressure and interrupts system operations when a pressure reading is sensed which is incompatible with previously executed operations.

11. A computer card as claimed in claim 1, wherein the microchip controller checks and accepts a new zero reference for pressure inside preset limits set every time the system is used, and interrupts system operation when pressure values are outside of said preset limits.

12. A computer card as claimed in claim 1, wherein a said purge valve is provided on a compressor tank of the system compressor and on at least one of a filter, dryer, condenser separator and an air network, and wherein the microchip controller controls the purge valve on the compressor tank and the purge valve on at least one of said filter, dryer, condensed separator and air network.

13. A computer card as claimed in claim 1, wherein the microchip controller manages and turns on and off the system compressor according to one of (i) preset values and (ii) a calculation with respect to operational pressure limits.

14. A computer card as claimed in claim 1, further comprising a safety valve.

15. A computer card as claimed in claim 1, wherein a second liquid crystal display along with a second screen and key set are disposed on a back portion of a housing so as to form a double-faced unit.

16. A computer card as claimed in claim 1, further comprising a serial communication port for receiving and transmitting data at least to one of a remotely operated modem, a printer and an infra-red sensor.

17. A computer card as claimed in claim 1, wherein an overpressure value is entered in the system for calibration of large tires.

18. A computer card as claimed in claim 1, further comprising a special emergency key adapted to be activated by hardware.

19. A computer card as claimed in claim 1, further comprising a relay for disconnecting an energy supply to the system and activating the solenoid valve for controlling deflation of the tire every time an emergency key is pressed.

20. A computer card as claimed in claim 1, further comprising a voltage to frequency converter for converting system voltage signals into a corresponding frequency.

21. A computer card as claimed in claim 1, wherein the microchip controller activates and monitors tire inflation and deflation responsive to the insertion of coins into the system.

22. A computer card as claimed in claim 1, wherein the microchip controller identifies the insertion of coins and activates a water pump and an opening valve and a closing valve of the water inlet control.

23. A computer card as claimed in claim 1, wherein the microchip controller activates solenoid valves of the vacuum cleaner control to open and close a vacuum supply for a vacuum cleaner, in response to the insertion of coins into the system.

24. A computer card as claimed in claim 1, wherein the microchip controller identifies the insertion of coins, and activates and monitors a detergent supply system responsive thereto.

25. A computer card as claimed in claim 1, wherein the microchip controller activates and monitors a nitrogen supply system.

26. A computer card as claimed in claim 1, wherein the microchip controller incorporates counters and totalizers for coins, for providing per operation, counting per kind of function counting used and general counting.

27. A computer card as claimed in claim 1, wherein counting totals for coins received by the system are provided responsive to use of a unique password for checking exactness and authenticity.

28. A computer card as claimed in claim 1, wherein the microchip controller system provides detection, at any time, of whether a tire is or not connected correctly to the system.

29. A computer card as claimed in claim 1, wherein the microchip controller, during inflating or deflating of a tire, detects possible pressure losses in a pressure line connected to the tire.

30. A computer card as claimed in claim 1, wherein the microchip controller checks whether the system is connected to tires without harm to an auto-reset function.

31. A computer card as claimed in claim 1, wherein the microchip controller processes an internal routine controlling only initiating a process for inflation or deflation of a tire, after the controller verifies that a line to be pressurized is completely stabilized, and presents an error message when pressure in a line connected to the tire does not stabilize after a predetermined period of time.

32. A computer card as claimed in claim 1, wherein the microchip controller calculates stabilization speed for current line pressure and compares the calculated stabilization speed with a standard minimum speed, and, depending on the results of the comparison, certifies that the line pressure is stable.

33. A computer card as claimed in claim 1, wherein the liquid crystal display displays an estimated time for finishing inflating or deflating of a tire, and said estimated time is updated on every pulse received by the liquid crystal display.

34. A computer card as claimed in claim 1, wherein the microchip controller stores, internally, standard minimum and maximum pressure limits which are preset for each type of installation with which the system is to be used.

35. A computer card as claimed in claim 1, wherein the microchip controller is adapted to receive changes with respect to minimum and maximum pressure limits, by means of said input keyboard, after inputting of a password by an authorized person.

36. A computer card as claimed in claim 1, wherein the microchip controller automatically calculates a minimum reliable pressure pulse in order to subsequently calculate a total inflating/deflating time for a tire.

37. A computer card as claimed in claim 1, wherein the microchip controller enters a standby mode a predetermined period without use, or if no key of the input keyboard is pressed.

38. A computer card as claimed in claim 1, wherein the microchip controller interrupts operation of the system, provides for exhibiting of a corresponding message, opens said deflation valve and activates the alarm, every time an error, failure or discrepancy occurs for three consecutive times during performance of a system operation or function.

39. A computer card as claimed in claim 1, wherein the microchip controller interrupts operation of the system, exhibits a corresponding message, opens said deflation valve and activates the alarm, every time any key is pressed during system operation.

40. A computer card as claimed in claim 1, further comprising a three-way solenoid valve for, when turned off, diverting air to the atmosphere so as to allow the compressor to operate continuously and without heating.

41. A computer card as claimed in claim 1, wherein the microchip controller provides for exhibiting of the complete totals of all items used and totals of all failures that occur.

42. A computer card as claimed in claim 1, wherein the microchip controller commands procedures including turning on the compressor, release of line pressure and checking of a compressor minimal internal pressure, and wherein when the system does not reach said minimal internal pressure, causes an "out of service" message to appear on the liquid crystal display.

43. A computer card as claimed in claim 1, wherein the liquid crystal display continuously exhibits the current time and a remaining usage time, and wherein the microchip provides for turning on of the system once said usage time has elapsed.

44. A computer card as claimed in claim 1, wherein the system includes an air-retention tip as a replacement for functions of those associated with filling of an empty tire.

45. A computer card as claimed in claim 1 wherein the system, once operation thereof is terminated, goes back into operation only after entry of a newly issued password.

46. A computer card as claimed in claim 1 wherein, during inflation of a tire, the system makes a check to ensure there is enough pressure in the air line.

* * * * *